March 27, 1951 W. B. BLANTON ET AL 2,546,627

TELEGRAPH SWITCHING SYSTEM

Filed July 8, 1948 21 Sheets-Sheet 1

INVENTORS
W. B. BLANTON
F. L. CURRIE
G. W. JANSON

BY

M. R. Marsh
ATTORNEY

TELEGRAPH SWITCHING SYSTEM

Filed July 8, 1948 21 Sheets-Sheet 2

INVENTORS
W. B. BLANTON
F. L. CURRIE
G. W. JANSON
BY
M. R. Marsh
ATTORNEY

INVENTORS
W. B. BLANTON
F. L. CURRIE
G. W. JANSON
BY
M. R. Marsh
ATTORNEY

March 27, 1951 W. B. BLANTON ET AL 2,546,627

TELEGRAPH SWITCHING SYSTEM

Filed July 8, 1948 21 Sheets-Sheet 4

BY

INVENTORS
W. B. BLANTON
F. L. CURRIE
G. W. JANSON

F. R. Marsh

ATTORNEY

TELEGRAPH SWITCHING SYSTEM

INVENTORS
W. B. BLANTON
F. L. CURRIE
G. W. JANSON

BY M. R. Marsh
ATTORNEY

TELEGRAPH SWITCHING SYSTEM

INVENTORS
W. B. BLANTON
F. L. CURRIE
G. W. JANSON
BY
M. R. Marsh
ATTORNEY

TELEGRAPH SWITCHING SYSTEM

Filed July 8, 1948 21 Sheets-Sheet 7

BY

INVENTORS
W. B. BLANTON
F. L. CURRIE
G. W. JANSON
M. R. Marsh
ATTORNEY

BY
INVENTORS
W. B. BLANTON
F. L. CURRIE
G. W. JANSON
M. R. Marsh
ATTORNEY

INVENTORS
W. B. BLANTON
F. L. CURRIE
G. W. JANSON
BY W. R. Marsh
ATTORNEY

INVENTORS
W. B. BLANTON
F. L. CURRIE
G. W. JANSON
BY
M. R. Marsh
ATTORNEY

INVENTORS
W. B. BLANTON
F. L. CURRIE
G. W. JANSON
BY M. R. Marsh
ATTORNEY

INVENTORS
W. B. BLANTON
F. L. CURRIE
G. W. JANSON
BY
M.R. Marsh
ATTORNEY

March 27, 1951 W. B. BLANTON ET AL 2,546,627

TELEGRAPH SWITCHING SYSTEM

Filed July 8, 1948 21 Sheets-Sheet 13

INVENTORS
W. B. BLANTON
F. L. CURRIE
G. W. JANSON

BY M. R. Marsh
ATTORNEY

INVENTORS
W. B. BLANTON
F. L. CURRIE
G. W. JANSON
BY
W. R. Marsh
ATTORNEY

March 27, 1951 W. B. BLANTON ET AL 2,546,627

TELEGRAPH SWITCHING SYSTEM

Filed July 8, 1948 21 Sheets-Sheet 15

INVENTORS
W. B. BLANTON
F. L. CURRIE
G. W. JANSON

BY

M. R. Marsh
ATTORNEY

March 27, 1951 W. B. BLANTON ET AL 2,546,627

TELEGRAPH SWITCHING SYSTEM

Filed July 8, 1948 21 Sheets-Sheet 16

INVENTORS
W. B. BLANTON
F. L. CURRIE
G. W. JANSON

BY

ATTORNEY

INVENTORS
W. B. BLANTON
F. L. CURRIE
G. W. JANSON
BY
*W. R. Marsh*
ATTORNEY

INVENTORS
W. B. BLANTON
F. L. CURRIE
G. W. JANSON
BY
W. R. Marsh
ATTORNEY

INVENTORS
W. B. BLANTON
F. L. CURRIE
G. W. JANSON
BY M. R. Marsh
ATTORNEY

March 27, 1951 W. B. BLANTON ET AL 2,546,627

TELEGRAPH SWITCHING SYSTEM

Filed July 8, 1948 21 Sheets-Sheet 20

INVENTORS
W. B. BLANTON
F. L. CURRIE
G. W. JANSON

BY

M. R. Marsh

ATTORNEY

TELEGRAPH SWITCHING SYSTEM

INVENTORS
W. B. BLANTON
F. L. CURRIE
G. W. JANSON
BY
M. R. Marsh
ATTORNEY

Patented Mar. 27, 1951

2,546,627

UNITED STATES PATENT OFFICE 2,546,627

TELEGRAPH SWITCHING SYSTEM

William B. Blanton, Rockville Centre, N. Y., and Frank L. Currie, Plainfield, and George W. Janson, Nutley, N. J., assignors to The Western Union Telegraph Company, New York, N. Y., a corporation of New York Application July 8, 1948, Serial No. 37,556

20 Claims. (Cl. 178—2)

This invention relates to telegraph exchange or switching systems and more particularly to the switching equipment and associated apparatus and controlling circuits at a telegraph central switching or relaying office, whereby telegraph messages received over incoming lines or channels at said office are repeated or relayed to desired outgoing lines or channels.

Instead of establishing a direct circuit connection at the central office between incoming and outgoing lines, as is the practice in the telephone art, the general practice with regard to telegraphy is to store the messages at the switching or central office incident to the relaying thereof through such an office. Such an arrangement enables more efficient use of the line circuits and increases the message handling capacity thereof as it permits transmission over any line, either incoming or outgoing, regardless of the busy condition of any other line.

To enable the relaying of telegraph messages through a switching center without the necessity of manually retransmitting, systems of the type disclosed in the patent to Blanton No. 2,279,295, granted April 14, 1942, and the patent to Wheeler et al. 2,193,810, granted March 19, 1940, have been proposed. In these systems, signals incoming over a line control an instrument to perforate a tape and thus store the signals. The perforated tape when the desired outgoing circuit is available, controls a transmitting device, such as a tape transmitter of the type disclosed in the patent to Benjamin No. 1,298,440, to transmit the stored signals to the circuit. The transmitter is connected to the proper outgoing circuit by the insertion of an associated multiple conductor plug into a jack representing the outgoing circuit. To enable the attendant to more readily determine the destination of an incoming message and the jack into which the plug is to be inserted, the perforator in addition to perforating the tape preferably is adapted to also print the message on the tape. Such mechanisms are usually referred to as printer-perforators and the patents to Dirkes et al. Nos. 2,143,828 and 2,174,731, discloses such devices.

In addition to the above type of manually controlled reperforator switching systems, a number of fully automatic switching systems have been proposed wherein destination-indicating selecting characters preceding each message control automatic switching equipment at the central office to automatically establish a transmitting path through the central office. Examples of these types of switching systems are found in the patents to Kleinschmidt No. 2,193,967, granted March 19, 1940, and to Colman No. 2,380,894, granted July 31, 1945.

Each type of system has a number of advantages as well as disadvantages. The former systems have the disadvantage of requiring considerable attention and time of an attendant such as determining the destination of the messages and inserting and removing the plugs but does have the advantage of enabling manual supervision and enables messages to be rerouted with a minimum of confusion and equipment as conditions change with respect to outgoing circuits.

The fully automatic systems have the advantage of requiring a minimum of attendant's time but the disadvantages of acquiring a considerable amount of equipment and to have little flexibility in respect to a change in routing. Furthermore, the latter systems have the disadvantage of requiring complicated and extensive directing signals and for this reason are impractical for use in a comprehensive nationwide system of telegraphy.

In general it is one of the objects of the present invention to provide a telegraph switching system embodying practically all the advantages of both of the systems outlined above and substantially none of the disadvantages thereof.

More specifically it is one of the objects of this invention to provide a telegraph switching system requiring a minimum of manual supervision and equipment, which is extremely flexible in operation in that it permits messages to be readily rerouted and which is admirably adapted for employment in conjunction with a comprehensive nationwide telegraph system.

Another object of the present invention is to provide a telegraph switching system wherein intraoffice transmission of messages at the switching center is directed by manually operable elements such as push buttons.

Another object of the present invention resides in the provision of a switching system wherein certain of the switching equipment is common to a plurality of sending or outgoing circuits so that such equipment is shared by a plurality of outgoing circuits.

In this respect a feature of the invention resides in the employment of switching equipment such as rotary switches for establishing intraoffice transmission paths between incoming and outgoing circuits with a desired path capable of being established through more than one route so that if the rotary switch normally employed in the establishment of a path is busy, a second and if it is busy, a third rotary switch is called into use to establish a desired intraoffice transmission path.

A still further feature of the invention in this respect resides in the employment of recording elements to record the number of times the various transmission paths of the shared switching equipment is used.

The above and further objects of the invention will be more apparent in the following detailed description of a preferred embodiment of the invention wherein reference is made to the accompanying drawings, in which—

*General description*

The system of the present invention is shown and described as it may be embodied in a so-called double storage reperforator switching system and in this respect is similar to a copending Blanton et al. application Serial No. 240, filed January 2, 1948. In such systems a first storage occurs in the tape prepared by the printer-perforator associated with an incoming circuit and the printed characters on the first storage tape enables the attendant to more readily determine the destination of the accompanying message. The attendant after determining the destination of a message in the tape issuing from the printer-perforator at a receiving position, operates the proper push button to direct the message through the intraoffice switching equipment to the desired so-called sending position where it is again stored in a tape adapted to control a transmitter sending to an outgoing circuit.

Normally there is a receiving printer-perforator, either singularly or in a concentrator arrangement, for each incoming line circuit and a sending circuit or position for each sending or outgoing line circuit. The transmission path from a receiving position to the desired sending position is established by the attendant operating push buttons which control rotary switches included in a so-called connector. This intraoffice transmission is usually at a much faster rate than that of the connecting line circuits and approximately half the length of time is required to transmit a message intraoffice as is required to transmit a message to a sending circuit.

The receiving positions are arranged in groups and each group with its associated set of destination push buttons and connector is referred to as a turret. In the above-mentioned copending application Serial No. 240 each intraoffice circuit is what is called a direct circuit. There each turret is capable of establishing a path to each sending position regardless and independently of paths which may be established from other receiving positions of that turret to other sending positions. Obviously with such an arrangement each receiving position, regardless of the number of messages transmitted, requires the same amount of equipment. In other words, a heavily loaded trunk circuit, in the arrangement of the above-mentioned copending application requires the same amount of equipment as a lightly loaded branch office circuit.

Figure 1:
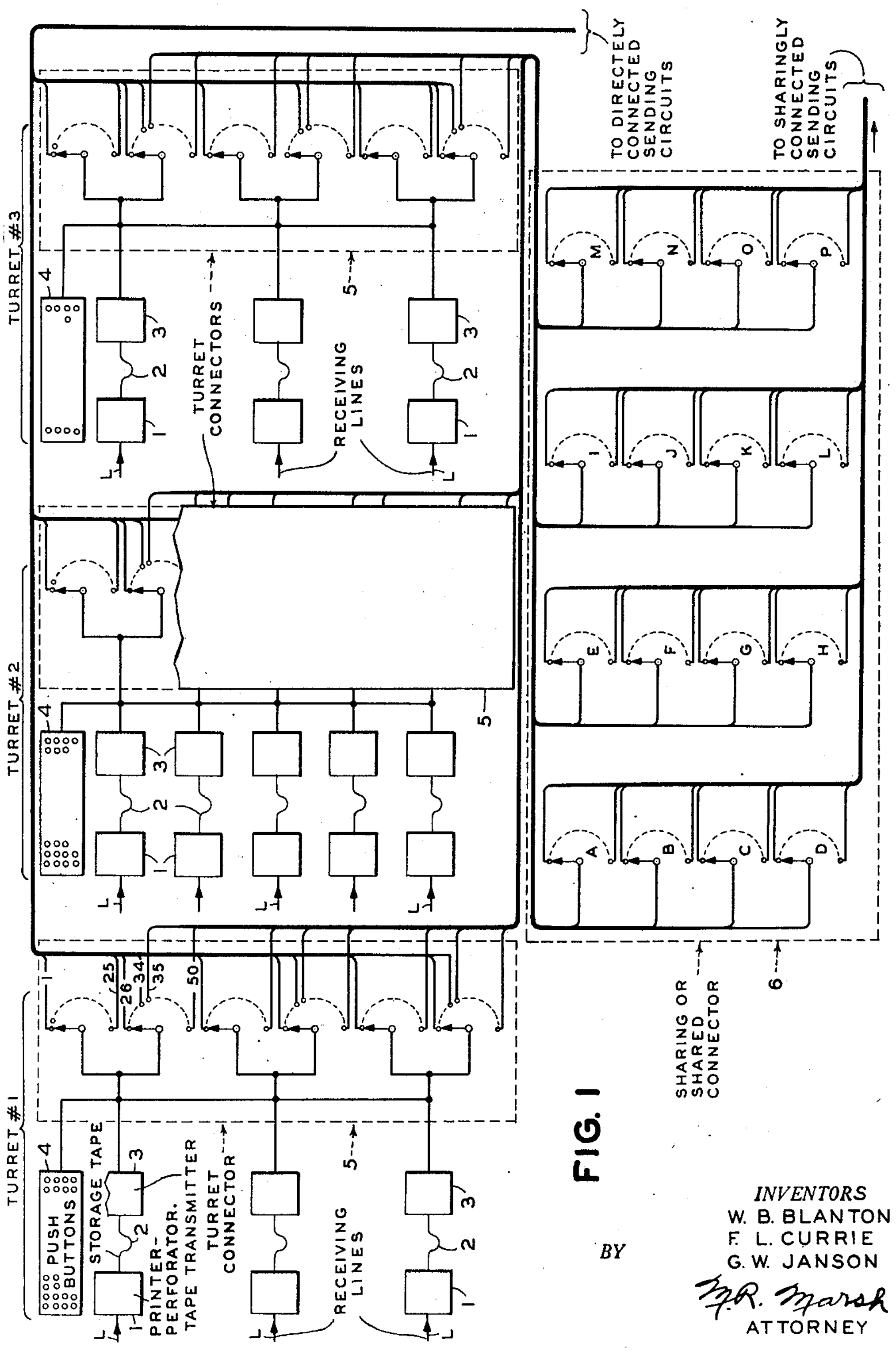
Fig. 1 is a schematic representation of the arrangement of the various elements of the complete system.

One of the general features of the present invention is the so-called sharing or shared connector circuit for establishing intraoffice transmission paths which is shared by a number of turrets and in this manner reduce the total amount of equipment required. Referring to Fig. 1, the printer-perforators 1 terminating associated incoming lines L, the storage tapes 2, and the tape transmitters 3 of the receiving positions, together with the push buttons 4 and turret connectors 5 of three turrets, No. 1, No. 2, and No. 3 are shown. The No. 1 and No. 3 turrets are shown as having three receiving positions each while turret No. 2 is shown as having five receiving positions. A turret may have any number of receiving positions and the number is normally determined by the density of the traffic over the incoming line circuits.

As shown in Fig. 1, each receiving position has associated therewith two rotary switches in the turret connector. Each of these rotary switches is of the multi-level twenty-five point type and circuits are established through the twenty-five points of the first switch of each pair, and the first nine points of the second switch directly to the sending positions of a total of thirty-four so-called directly connected circuits. These circuits are established in the manner set forth in the above-mentioned copending application. The last sixteen points of the second rotary switch of each receiving position pair are connected in parallel to the wipers of sixteen rotary switches, indicated as A to P, of the so-called shared or sharing connector 6. The sharing connector rotary switches each have twenty-five points and if each point thereof extended to a separate sending position, a connection to four hundred different sending positions could be established through the sharing connector. However, as will be more fully set forth hereinafter, the transmission paths through the sharing connector are so arranged that a plurality of paths may be established to the same sending position through different switches thereof. These paths may be arranged for example, with some of the sending positions connectable to a receiving position by three different paths through the sharing equipment and others by two different paths. The first are termed three appearance circuits and the latter two appearance circuits. In operation of the sharing connector, a transmission path is normally established through the rotary switch having the first appearance of the desired sending position, and when this rotary switch is busy by virtue of having a path to another sending position established therethrough, the sharing connector functions to establish the transmission path through an alternate route.

The number of appearances of a sending position on the points of the various rotary switches of the sharing connector is, of course, determined by the expected or usual traffic handled over the associated sending circuit. The heavily loaded circuits such as the trunk circuits extending away from the switching center would be assigned to the so-called direct intraoffice circuits of which there are thirty-four in the arrangement of Fig. 1, and the intraoffice paths to such direct intraoffice circuits are established independently of the sharing connector. The next heaviest loaded outgoing circuits would have three appearances on the points of the rotary switch of the sharing connector and the lightest loaded circuits would be arranged to have two appearances. Obviously many variations in the arrangements of the circuits with respect to the direct circuits as well as the shared intraoffice circuits are possible and the appearances of any circuit in the sharing connector is not limited to three and neither does a circuit have to appear twice as a very lightly loaded circuit might appear but once.

As set forth in the above-mentioned copending application, each receiving position has associated therewith control circuits for automatically performing various functions. These functions include the idling of blank tape containing message separating perforations through a transmitter so as to bring the first character of a message over the sensing pins thereof. At such a time a signaling device may function to apprise the attendant of a message or at least a part thereof in the storage tape. Thereupon the operator may, as would be the case in some instances, without waiting for the entire message to be received, proceed to direct the message to the proper sending position. The operator determines the proper sending position by reading the printed address characters alongside the perforations, which address normally appears at the first part of the message.

Since the turret connector is common to a plurality of sending positions, it must be first seized by the sending position from which a message is to be relayed to prevent other sending positions from attempting to establish a connection therethrough at the same time. This seizing of the turret connector is effected by operating a so-called transmitter initiate push button or key, one of which is individual to each transmitter, and thereafter the operator may operate the destination indicating push button representing the outgoing circuit over which the message is to be transmitted. Thereupon the turret connector functions to establish the intraoffice path from the receiving position transmitter to the reperforator associated with the desired sending position, and if the reperforator is not busy, the stored message at the receiving position is transmitted to the sending position where it appears in the tape controlling the sending position transmitter. This intraoffice transmission is at a much higher rate than that normally employed over either incoming or outgoing circuits and accordingly the intraoffice transmission does not tie up the switching equipment for prolonged periods. When an intraoffice circuit or path is established through a turret connector, the common equipment thereof is released and made available for seizure by the other receiving positions of the turret, and since the common equipment is seized only during the establishment of the intraoffice transmitting path, any delay incident to switching from other sending positions is kept at a minimum and may be a matter of only a small fraction of a second. This delay is normally less than would be required for the operator to read the tape at another receiving position to determine the destination of a second message.

When an intraoffice transmission path is to be established through the sharing connector, the operation of a destination indicating push button representing such a path effects seizure thereof and prevents receiving positions of other turrets from attempting to establish transmission paths therethrough until the path from the first receiving position has been established. Thus the sharing connector functions in substantially the same way with respect to the turrets associated therewith as does a turret connector with respect to its associated receiving positions. Similarly, the sharing connector is seized only momentarily or while a transmission path is being established and after the establishment thereof it is available for the establishment of other paths therethrough either from receiving positions of the same or the other turrets.

Included in the sharing connector is a so-called alternate assigner which functions to establish a desired transmission path through the rotary switch having the second appearance when another transmission path is already established through the rotary switch having the first appearance. Likewise the alternate assigner functions to establish the transmission path through the rotary switch having the third appearance when the rotary switches having the first and second appearances are busy.

To advise the attendant of the progress of the establishment of a connection through the switching equipment, various signal lights are employed. These signal lights include so-called turret switching lights, turret busy lights, and lights to indicate when the rotary switches of the sharing connector having all the appearances of a desired sending position are busy.

Obviously, where there is but a single reperforator at the sending position it may be busy storing a message in the storage tape at the sending position when an attempt is made to establish an intraoffice transmitting path thereto from a second receiving position. In order that the attendant not be required to wait until the completion of the intraoffice transmission of the first message, the switching equipment functions to register the second and other connections desired to the same sending position reperforator and completes these transmission paths one at a time when the sending position equipment becomes available. In this connection an end-of-message signal appended to each message automatically releases the intraoffice transmitting equipment and permits the necessary parts thereof to be automatically seized by another transmitter circuit waiting to transmit a message intraoffice.

The traffic density through the intraoffice equipment and particularly that associated with the outgoing circuits with which the sharing connector is associated may vary from time to time and require redistribution and assignments of the outgoing circuits in order to most efficiently use the equipment. In this connection a plurality of electromagnetic counters are included in the equipment of the sharing connector and are arranged to (1) indicate the total number of switching operations made through the sharing connector; (2) indicate the number of times the use of the second appearance or first alternate path to a sending circuit is employed; (3) indicate the number of times the use of the third appearance or second alternate path to a sending circuit is employed; and (4) indicate the number of times that all appearances or alternates of a desired sending circuit are busy.

*Intraoffice transmitter circuit*

Figures 2, 22:
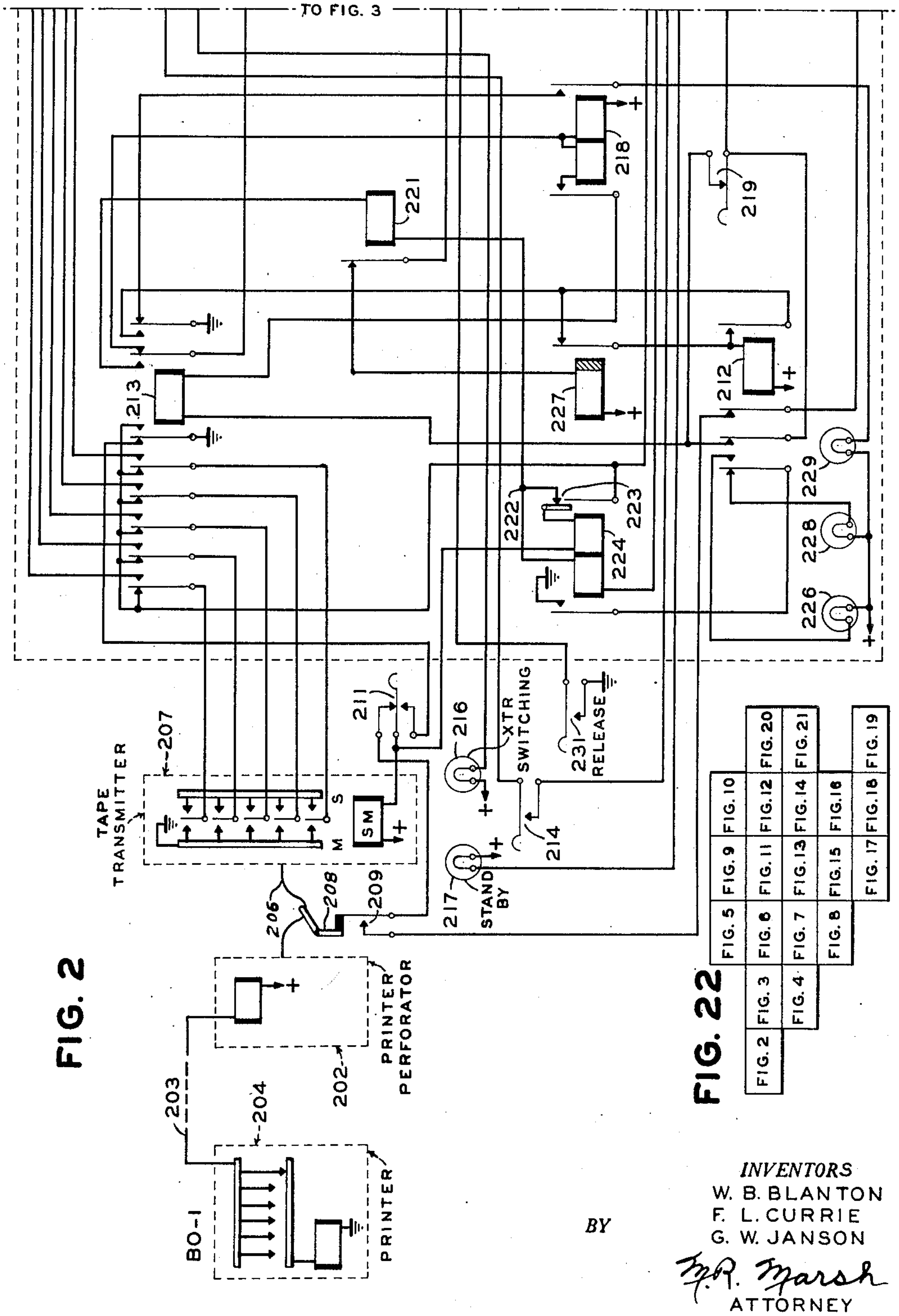
Figs. 2 and 3 illustrate the details of the circuits of a receiving position.
Fig. 22 shows the manner in which Figs. 2 to 21 may be arranged relative to each other to illustrate the details of a complete system.
Figure 3:
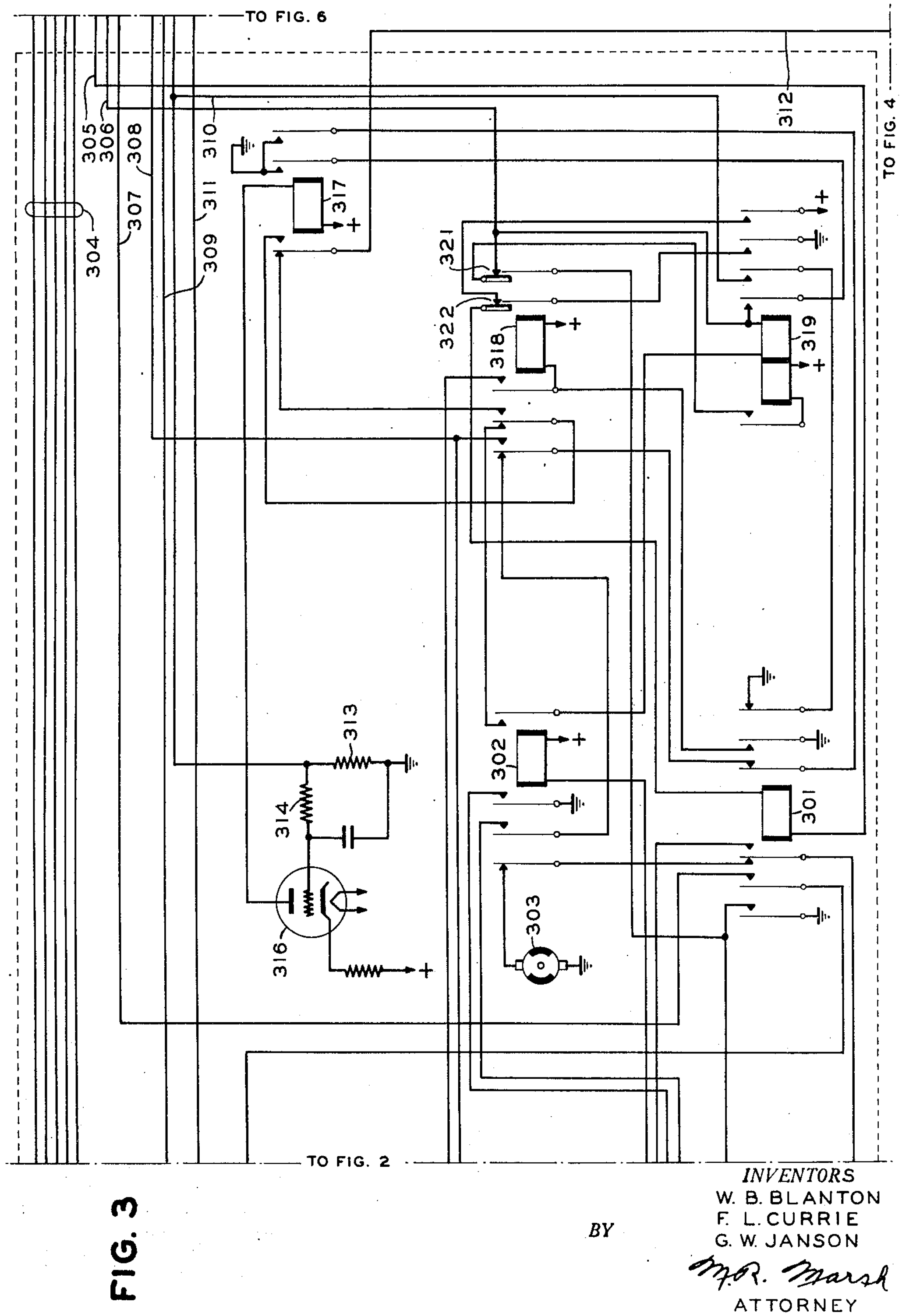

As the name implies, an intraoffice transmitter circuit is the equipment and control circuits employed in conjunction with the intraoffice transmitter to relay a message intraoffice, as for example, to relay a message from the tape of a printer perforator of a receiving position to the tape of the perforator at a sending position. The details of an intraoffice transmitter circuit are shown in Figs. 2 and 3 where is also shown the printer-perforator 202 terminating an incoming line 203 from a branch office 204. The branch office equipment includes means for transmitting message material therefrom to the printer-perforator 202 which responds to store the message signals in the storage tape 206. In the preferred arrangement the printer perforator 202 also prints on the tape 206.

Associated with the printer-perforator 202 and adapted to be controlled by the tape 206 issuing therefrom is a tape transmitter 207 and for the time being it will be assumed that the tape 206 between the printer-perforator and the tape transmitter contains nothing but blanks. In this connection the printer-perforator 202 may include either a fully automatic or a manually controlled tape feedout device to permit a sufficient length of blank tape to be fed therethrough so as to enable the last message character to reach and pass beyond the sensing pins of the tape transmitter 207. Tape feedout devices of this type are well known in the art and normally function to feed out only a predetermined length of blank tape after cessation of signals and a tight tape condition exists between the printer-perforator and the tape transmitter.

With the above assumed conditions let it be further assumed that the branch office 204 begins to transmit a message to the printer-perforator 202 which accordingly perforates the tape 206 and increases the size of the tape loop. The increase in size of the tape loop permits a tape lever 208 to effect closure of tape lever contacts 209 which in closing establish a step circuit for the operation of the step magnet SM of the tape transmitter. This circuit extends from potential through the coil of the step magnet SM, upper contacts of a key 211, tape lever contacts 209, the back contact and inner left hand tongue of a relay 212, the inner left hand tongue and back contact of a relay 301, the outer left hand tongue and back contact of a relay 302, and through an impulse unit or circuit interrupter 303 to ground. Accordingly, as long as this circuit is maintained, the step magnet will be periodically energized to advance the tape 206 through the transmitter 207. This operation continues until the first character of the message being perforated in the tape appears over the sensing pins of the transmitter at which time the step circuit is interrupted by the operation of relay 302 and further advancement of the tape ceases for the time being.

The tape transmitter 207 may be of the type in general use in the telegraph art, such as that disclosed in the patent to Benjamin No. 1,298,440. Such tape transmitters include a set of sensing pins for probing the perforated tape with corresponding contact-making tongues which contact either a marking M or a spacing bus bar S depending upon whether the associated feeler pin senses a perforated or a non-perforated section of the tape.

In the arrangement of the present invention, the tap transmitter 207 has its marking bus bar connected to ground and the tongues, of which there are five, are connected by individual conductors to the five outer left hand tongues of a relay 213. The back contacts of the five outer left hand tongues, as well as the front contact of the inner left hand tongue of relay 213, are connected in parallel and through the coil of relay 302 to potential. Relay 213 at this time will be unenergized and as long as nothing but blanks appear in the transmitter the tongues of the transmitter contact only the spacing bus bar S and the circuit to relay 302 will not be completed. However, when one or more of the tongues of the transmitter 207 contact the marking bus bar M a circuit is completed from ground thereat through the coil of relay 302 to operate the same which in operating interrupts the step circuit to the step magnet SM of the transmitter. Accordingly, when the first message character of a message in the tape 206 appears over the sensing pins of the transmitter, which message character will have at least one marking impulse as distinguished from the all spacing blanks in the tape, further advancement of the tape automatically ceases. For the time being, nothing more occurs at the intraoffice tape transmitter circuit until the intervention of the attendant and attention will now be directed to the connector circuit. The attendant may be appraised of the storage of message material in the tape 206 between the printer-perforator 202 and tape transmitter 207 by any one of a number of well known types of signaling circuits or she may be aware of this condition by visually observing the accumulation and increase in size of the tape loop.

*Turret connector*

Each so-called turret of a system embodying the present invention has equipment which is common to the several receiving positions and their associated intraoffice tape transmitter circuits as well as a group of so-called destination indicating push-buttons, one button for each destination to which a message may be sent. The turret connector serves to establish a transmission path from an intraoffice transmitter circuit directly to the so-called directly connected sending positions or indirectly through the so-called sharing connector to the so-called shared or sharingly connected sending positions.

Figure 4:
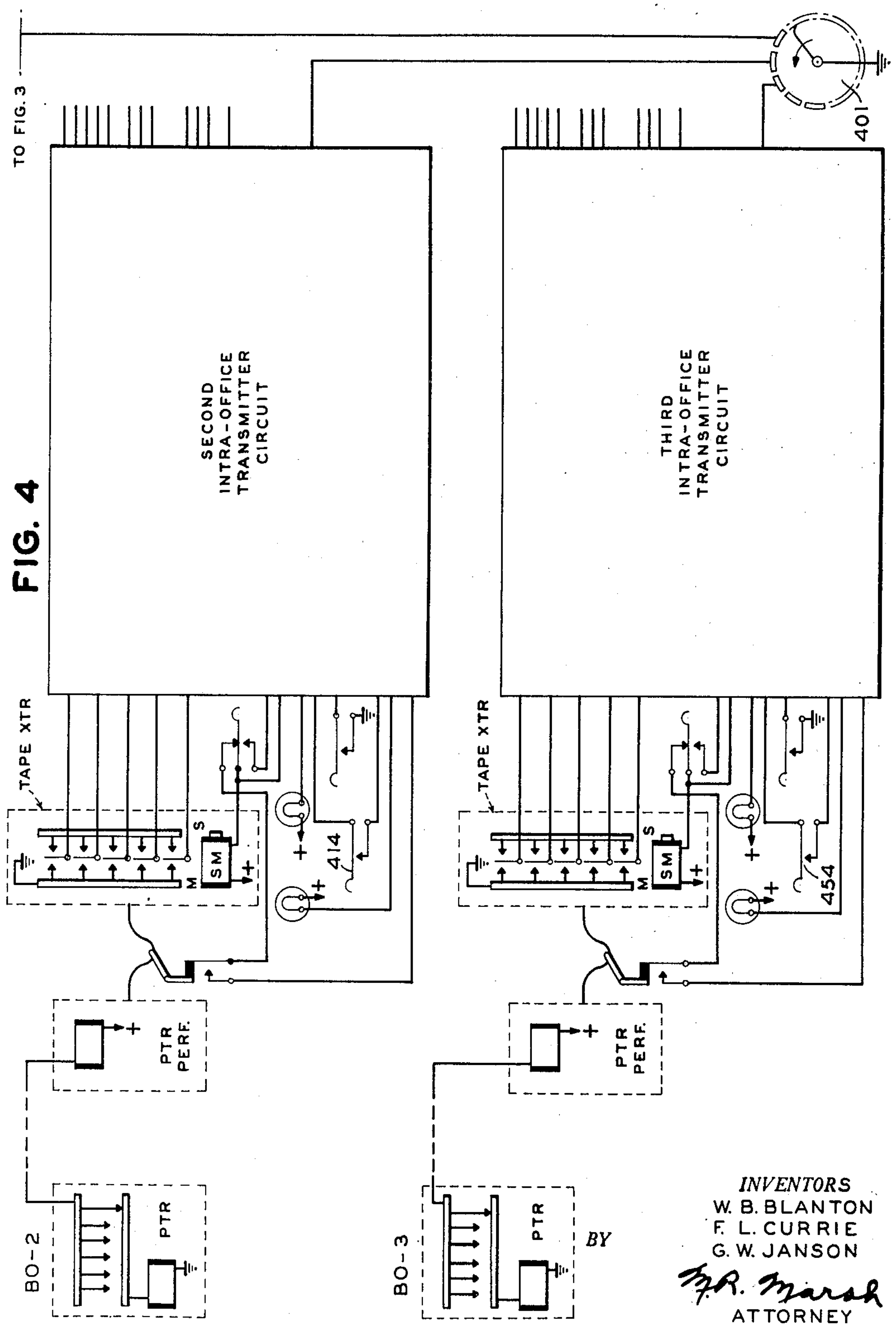
Fig. 4 illustrates a part of the circuits of a second and third receiving position.

Each turret connector has a separate section for each of its associated receiving positions and their intraoffice transmitting circuit. For example, the intraoffice transmitter circuit of Figs. 2 and 3 may be associated with the first section of Fig. 6, of the connector of turret No. 1 and the receiving positions and intraoffice transmitter circuits of Fig. 4 may be associated with the second, Fig. 7, and third, Fig. 8, sections of this turret connector. As to be pointed out hereinafter in detail, the various sections of a turret connector are arranged in an interlocking manner so that only one intraoffice transmitter circuit can seize the same during the establishment of a transmitting path therethrough. However, since the turret connector is exclusively seized only during the establishment of the transmission path which normally takes but a fraction of a second the exclusive seizing does not appreciably delay its operation.

Each intraoffice transmitter circuit, such as the one of Figs. 2 and 3, is connected to an associated section of its turret connector by some twelve conductors. The upper five of these conductors, referred to generally by reference numeral 304, are the so-called signal conductors which in the manner hereinafter pointed out are for the purpose of transmitting intelligence impulses representing the message characters stored in the tape 206. The next conductor 305 provides a so-called private circuit, while the other six conductors 306 to 311 are called, initial seize circuit, transmitter step circuit, transmitter disconnect circuit, initiate circuit, start circuit and transmitter switch circuit, respectively. In addition to the above circuits or conductors, each intraoffice transmitter circuit has a conductor, such as 312, extending to an individual segment of an intraoffice transmitter circuit allotter 401. The continuously rotating brush of the circuit allotter is grounded so that a ground is applied over conductors such as 312 to each of the intraoffice transmitter circuits at a switching office in turn. This ground permits only one intraoffice transmitter circuit to be connected to a sending position at any one time and thereby prevents connection of more than one such circuit to a sending position.

*Seizure of turret connector*

Each receiving position associated with the turret connector can exclusively seize the connector provided the connector is not at the time establishing a connection from any one of its other receiving positions. The seizing of the connector is effected by the attendant operating the so-called transmitter initiate push-button, such as by push-buttons 214, 414 and 454 of the first, second and third intraoffice transmitter circuits, respectively, of Figs. 2 and 4.

Figure 6:
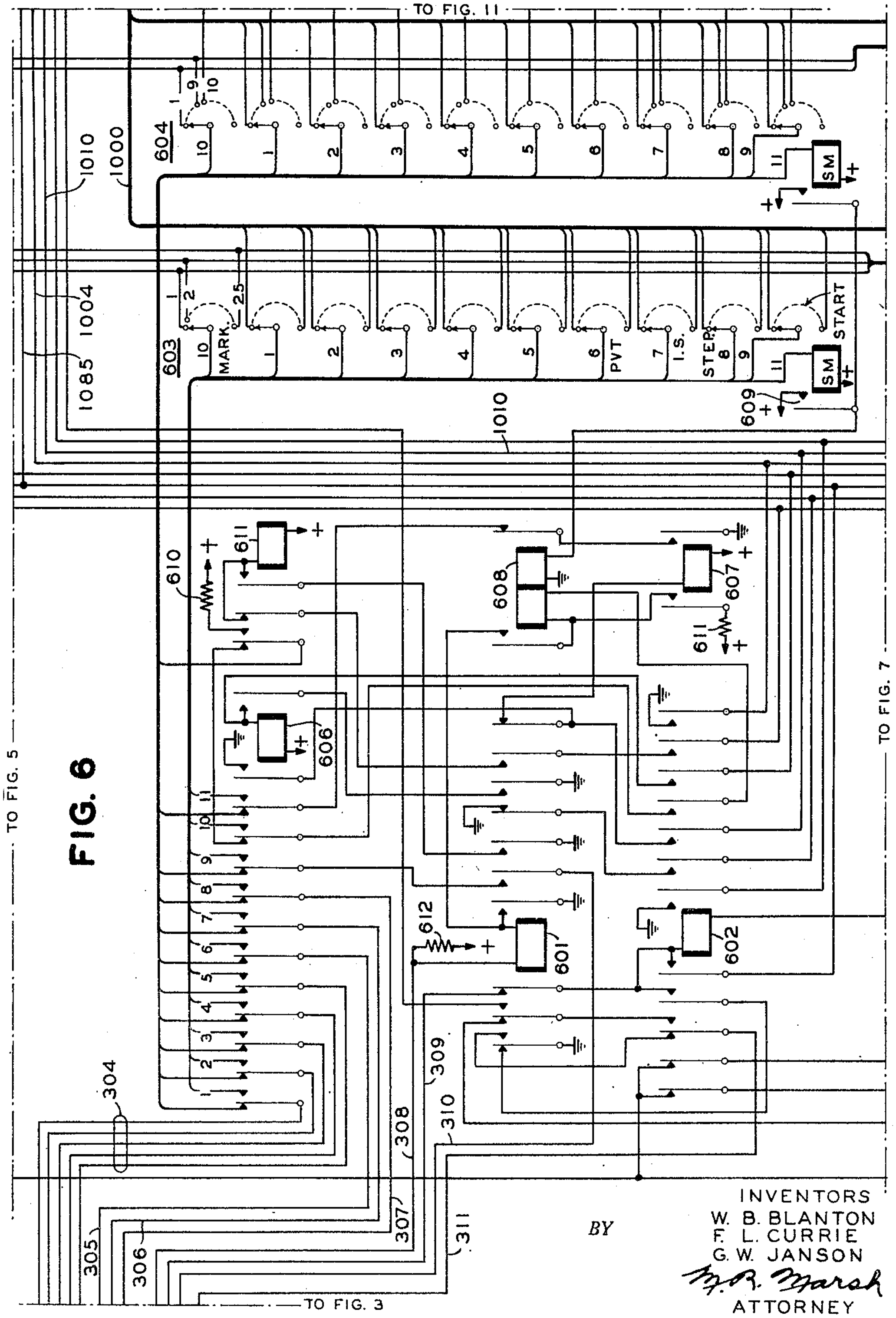
Figure 7:
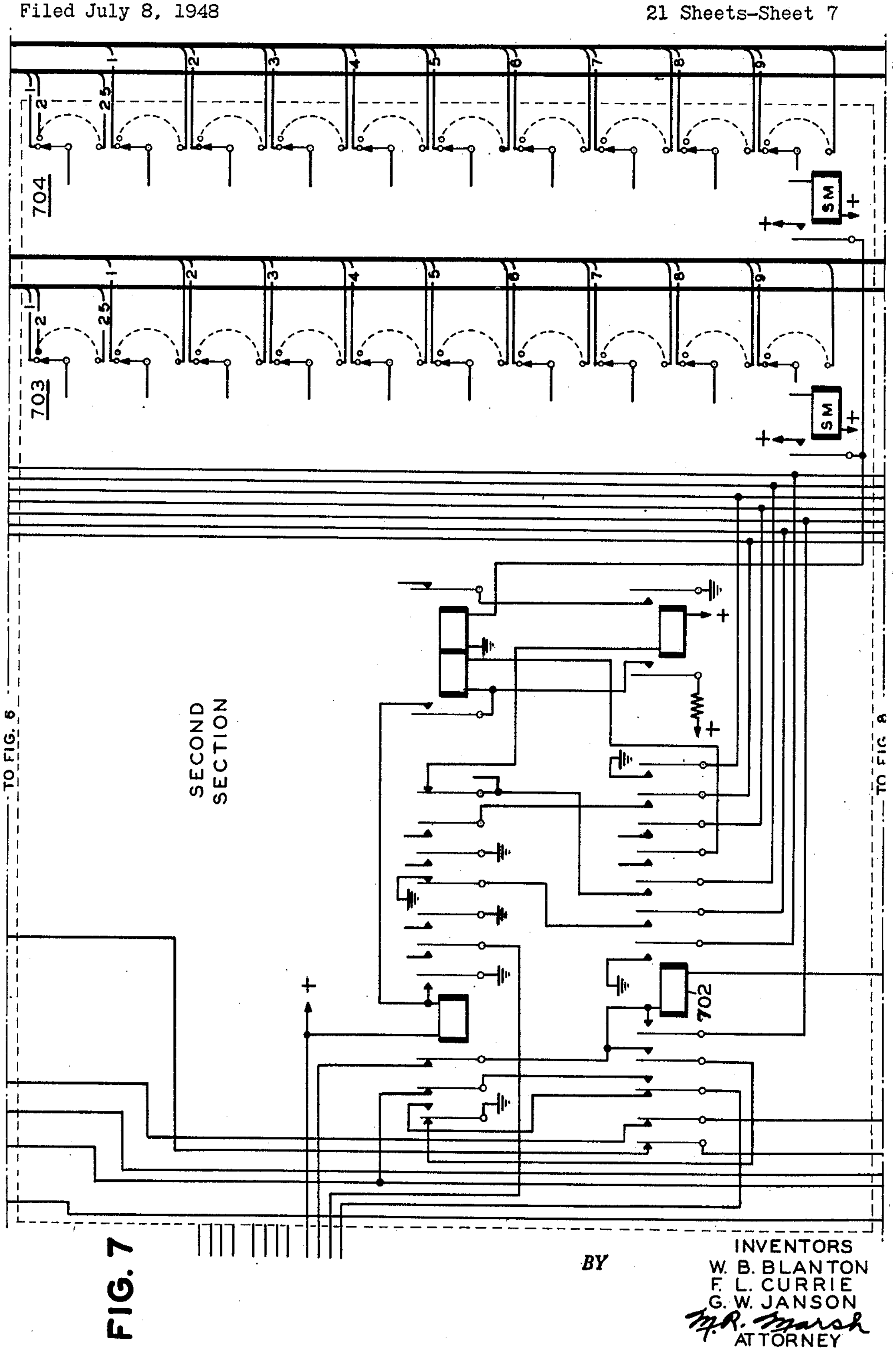
Figure 8:
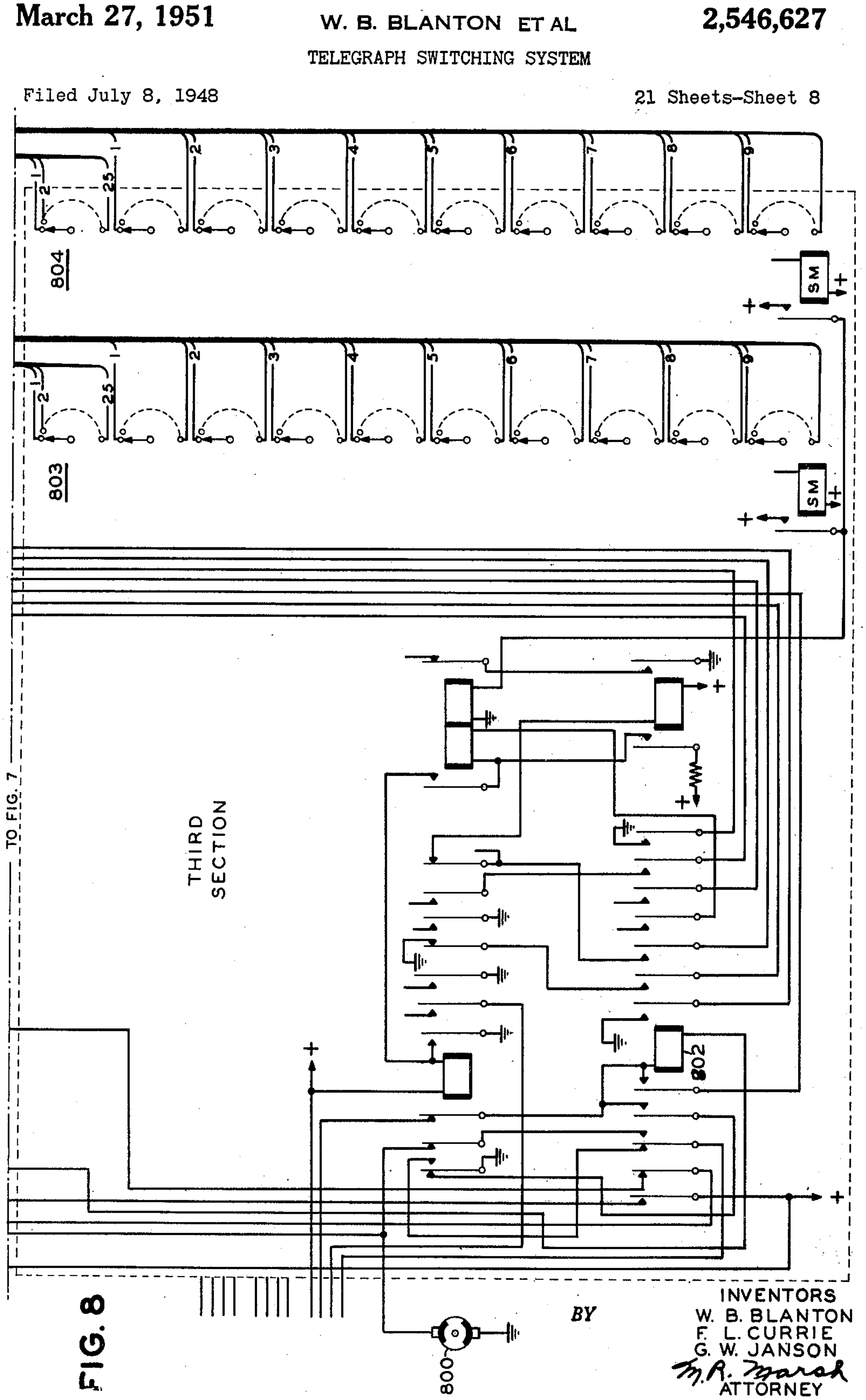
Figure 9:
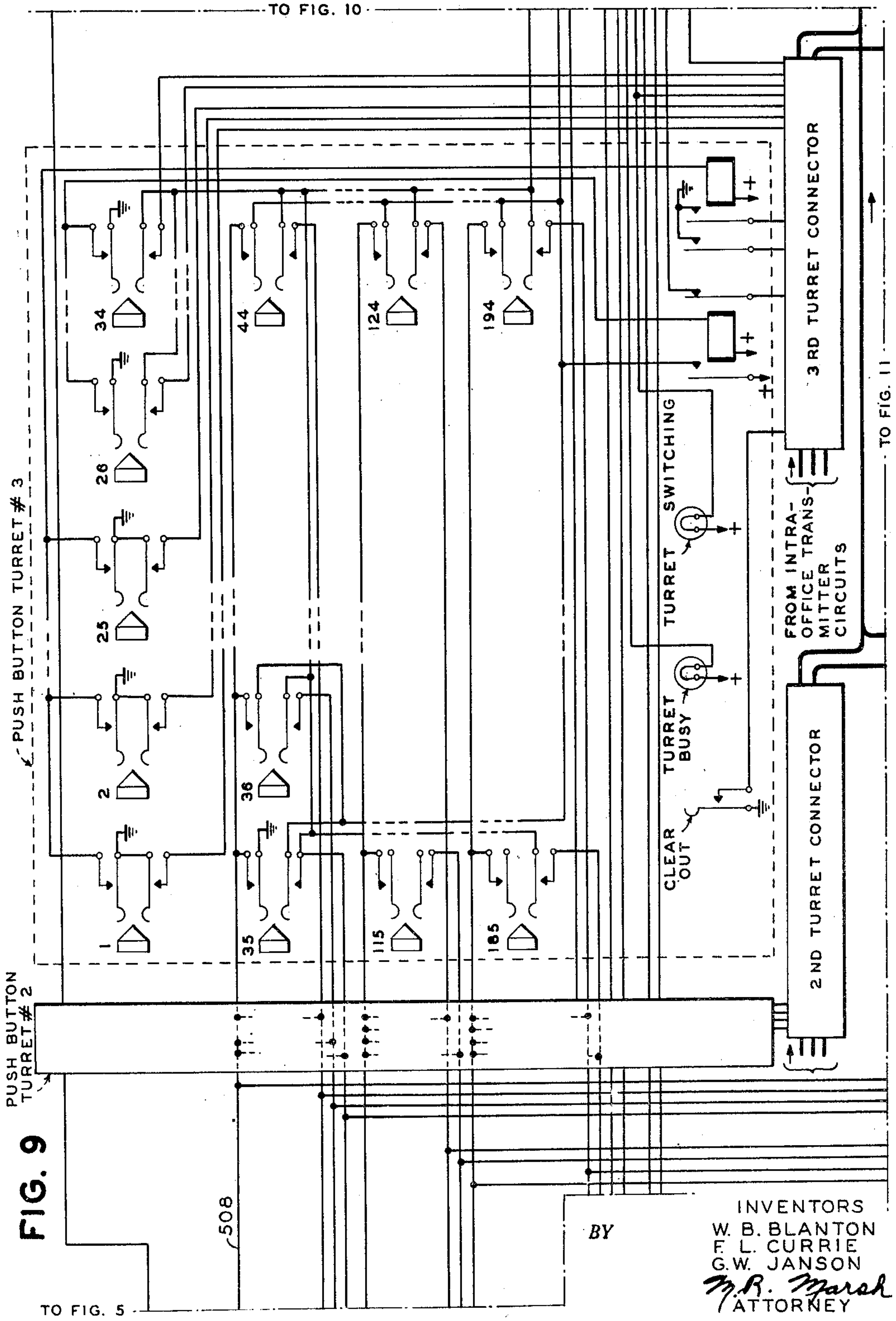

Let it be assumed that the No. 1 turret connector of Figs. 6, 7 and 8, is not engaged in establishing a transmission path from any of its associated intraoffice transmitter circuits and that the attendant actuates the transmitter initiate push button 214 of the first intraoffice transmitter circuit which at this time has the first character of a message stored in the tape 206 over the pins of the tape transmitter 207. As will be recalled, the appearance of this first character over the pins of transmitter 207 caused relay 302 to become energized and stop further advancement of the tape therethrough. In addition to opening the step circuit of the tape transmitter 207, relay 302 in operating through its inner left hand tongue and front contact actuates the transmitter initiate push button 214 by applying a ground to the lower contact thereof. Subsequent operation of push button 214 extends the above ground over the initiate 309 extending to the turret connector where the circuit is continued through the back contact and inner left hand tongue of a relay 601, the coil of relay 602 and back contacts and tongues of relays 702 and 802 to potential. Thus, if relays 702 and 802 are unoperated, which is their assumed condition with the turret connector otherwise idle, the operation of the transmitter initiate push button 214 will cause relay 602 to operate. As this relay operates it locks up through the front contact and second left hand tongue thereof ground through the back contact and outer left hand tongue of relay 601.

In a similar manner, operation of either one of the transmitter initiate keys 414 and 454 of the second and third intraoffice transmitter circuits associated with other sections of the No. 1 turret connector, Figs. 6, 7 and 8, will complete circuits for operating associated relays 702 and 802 when these intraoffice circuits have a message waiting to be relayed through the switching equipment. The circuits for operating relays 602, 702 and 802 as shown extend through back contacts of the others and hence when one of these relays is operated, a circuit cannot be completed for the operation of one of the others. However, an operated one of the relays 602, 702 or 802 is released as soon as the desired path is established from an intraoffice transmitter to a sending position and the connector circuit is thereafter available for seizure by the other intraoffice transmitter circuits of the associated group.

The operation of relay 602 completes a circuit from ground through an interrupter 800, the back contact and second left hand tongue of relay 601, front contact and third left hand tongue of relay 602, the transmitter switch circuit 311 and a so-called transmitter switching lamp 216 to potential. The transmitter switch lamp 216 is preferably located adjacent the tape transmitter 207 and transmitter initiate push button 214 and the completion of the above circuit effects flashing of the lamp to inform the attendant that the turret connector has been seized and that she may now proceed with the operation of the desired one of the destination indicating push buttons.

Figure 5:
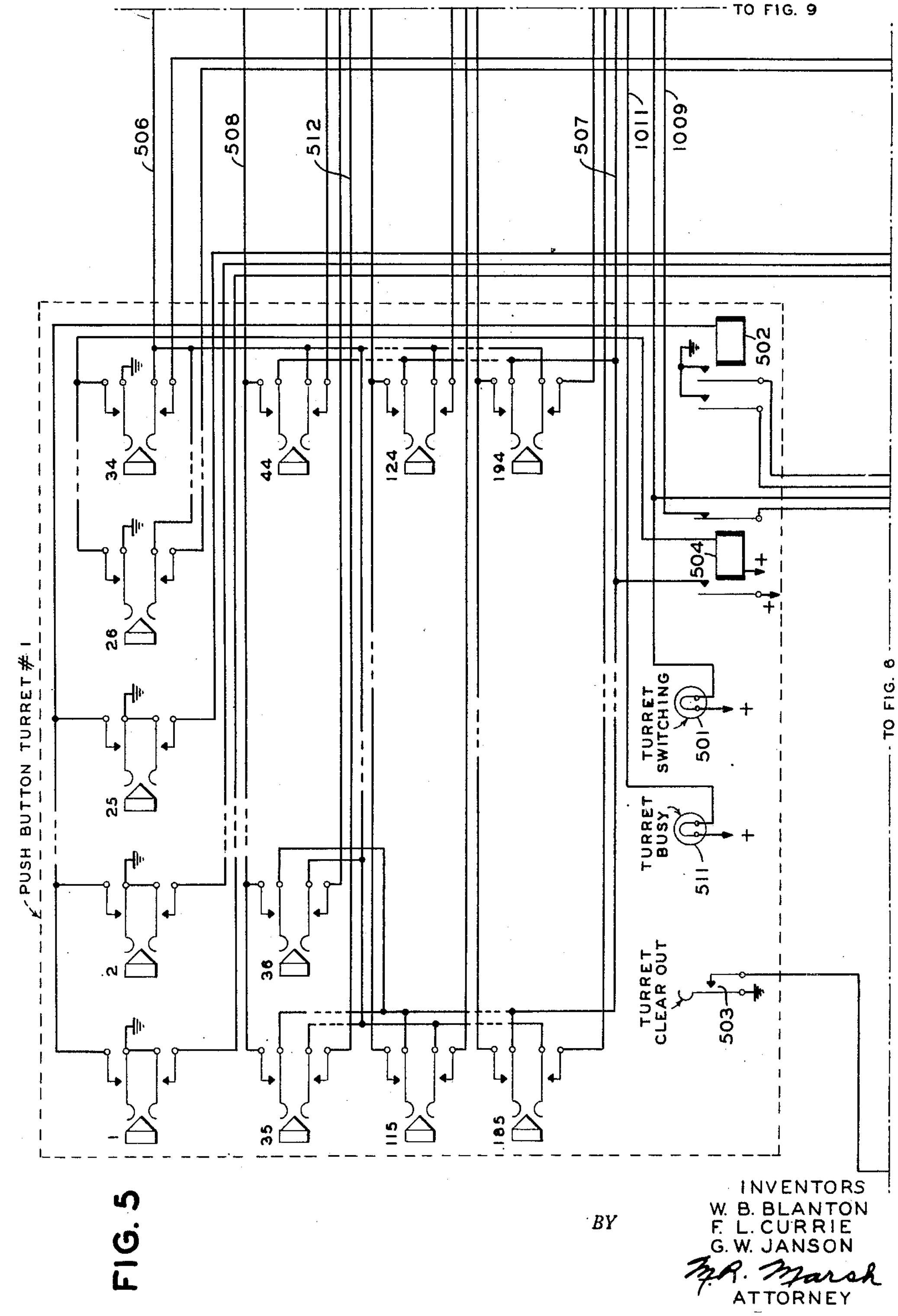
Figs. 5 to 19 illustrate three turrets with their associated turret connectors and a sharing connector common to the three turrets and as much of their detail circuits as are necessary for a proper understanding of the operation thereof.

The destination indicating push buttons, one for each destination to which a message may be switched are located in groups, one group being provided for each turret. A number of the push buttons of turret No. 1 and their associated circuits are shown in Fig. 5 and it will be assumed that push button No. 1 represents the destination to which the message in the tape 206 is to be switched. As a matter of convenience the destination push buttons of each turret may be divided into three groups as follows: group I including push buttons Nos. 1 to 25; group II including push buttons Nos. 26 to 34; and group III including push buttons Nos. 35 to 194.

The group I push buttons of each turret control the direct switching to the first twenty-five directly associated sending circuits. These push buttons are not interconnected with the push buttons of any other turret nor with the common sharing equipment, and their circuits function entirely independently of the common sharing equipment.

The group II push buttons Nos. 26 to 34 control the switching to nine directly associated sending circuits. The marking points of these push buttons appear on the same rotary switch as the marking points for the sixteen sections of the sharing connector. Accordingly when one of these push buttons is actuated, exclusive control of the sharing equipment must be gained.

The remainder of the push buttons in the turret or group III, Nos. 35 to 194, control the establishment of a transmission path through the common sharing connector. The group III push buttons of the turrets controlling a sharing connector are interconnected in the manner indicated in the drawings, and the arrangement is such that the No. 1 springs of push buttons 35 to 44 of all three turrets are multipled together and connected to contacts and coils of relays in an associated section of the sharing connector. The No. 2 springs of these push buttons in a turret are multipled together and connected through the coil of an associated turret relay and back contacts of the other turret relays. Therefore, when one of these push buttons 35 to 44 is actuated, a circuit is completed for exclusively seizing the sharing connector on behalf of the turret containing the depressed push button and for starting the switching operation of the rotary switch in the associated section of the sharing connector. The third contact of all the sharing push buttons 35 to 194 of each turret are multipled together and connected through a front contact of its associated turret relay to ground, while the No. 4 springs of these push buttons of each turret are multipled together and connected to the marked level of the rotary switch upon whose points the desired sending circuit appears. The first of the above circuits provides for seizing and operating the sharing connector from only one turret at a time, and the second circuit provides for marking the rotary switch of the sharing connector section and alternate assignor switches only from the turret whose turret relay is operated.

Each section of a turret connector has a pair of multilevel rotary switches either one of which is employed in establishing a transmission path. The No. 1 turret connector has rotary switches 603 and 604 in the first section, 703 and 704 in the second section and 803 and 804 in the third section. The thirty-four so-called direct transmission paths are established through the twenty-five points of rotary switches 603, 703 and 803 and the first nine of the points of rotary switches 604, 704 and 804. As indicated, corresponding points of the various levels of these rotary switches are multipled together and extend to common terminals. For example, the twenty-five points of the upper or marking levels of rotary switch 603 are multipled to corresponding points of the upper levels of rotary switches 703 and 803 and extend to the lower terminals of the destination push buttons 1 to 25. Similarly, the first nine points of the upper marking level of switches 604, 704 and 808 extend to the lower terminals of destination push buttons 26 to 34.

Associated with each push button turret is a so-called turret switching lamp, such as 501, which is caused to glow steadily when a transmitter switching lamp, such as 216, at a tape transmitter is caused to flash. The circuit for the turret switching lamp 501 is completed by the operation of relay 602 and extends from ground through the back contact and fourth right hand tongue of relay 601, the front contact and second right hand tongue of relay 602, and the turret switching lamp 501 to potential. Similarly, operation of corresponding relays 702 and 802 cause lamp 501 to glow and inform other attendants who may be switching messages through the particular turret connector that it is busy and has been seized for the establishment of a transmission path. Relay 602 in operating prepares a number of other circuits which are not completed until the operation of one of the destination indicating push buttons.

*Operation of destination push buttons Nos. 1 to 25*

Assuming that the message in the tape 206 is intended for the destination represented by the No. 1 push button and that after observing the flashing of the intraoffice transmitter switching lamp 216 and the steady glowing of the turret switching lamp 501, the operator depresses the No. 1 push button. The destination push buttons when actuated should be held depressed until the desired connection has been established and in this respect differs from the transmitter initiate key 214 which may be released immediately after operating. When the desired connection has been established the turret switching lamp 501 ceases to glow and the destination push button may be released.

The operation of turret push button No. 1 through its upper contacts completes a circuit for the operation of relay 502 and through its lower contacts marks or applies a ground to the corresponding point on the upper level of rotary switches 603, 703 and 803. In a similar manner operation of push buttons 2 to 25 cause operation of relay 502 and the marking of corresponding points on the upper level of these rotary switches. Since only the first section, Fig. 6, of the turret connector is activated by operation of its relay 602, the marking of points on switches 703 and 803 will have no effect on their respective sections.

Operation of relay 502 through its outer tongue completes a locking circuit for relay 602 and by its inner tongue relay 502 applies a ground through the fifth right hand tongue and front contact of relay 602, through the coil of relay 606 to potential. Relay 606 thereupon operates and through its eight outer left hand tongues transfers the five signal conductors 304, the private circuit 305, the initial seize circuit 306 and the transmitter step circuit 307 normally extending to the second, third, fourth, fifth, sixth, seventh, eighth and ninth wipers of rotary switch 604 to such wipers of switch 603 along with the circuits normally extending to the first and tenth wipers of switch 604 to similar wipers of switch 603. Also, relay 606 in operating, through its inner left hand tongue completes a circuit from ground through the seventh right hand tongue and back contact of relay 601 and the coil of relay 607 to potential whereupon relay 607 operates. Relay 607 in operating completes a circuit from ground through its right hand tongue and front contact, the right hand tongue and back contact of relay 608, the second left hand tongue and front contact of relay 606 to the step magnet SM of rotary switch 603. The step magnet SM is thus energized and effects the closing of associated contacts 609 to complete a circuit through the right hand coil of relay 608. Relay 608 thereupon operates and opens the circuit through its right hand tongue to the coil of the step magnet SM of the switch 603 whereupon the latter releases and effects advancement of its wipers. The release of the step magnet SM opens its associated contacts 609 to interrupt the circuit through the right hand coil 608 whereupon it releases and reestablishes the circuit to the step magnet SM and such operations of the step magnet and relay 608 continue until the wiper of the first or marking level rotary switch 603 reaches its marked or grounded point. All the wipers of switch 603 rotate together and when the upper wiper reaches the grounded or marked point, which for the assumed condition was the first point, the ground thereat is extended through the front contact and third left hand tongue of relay 606, the front contact and fourth right hand tongue of relay 602, the left hand coil of relay 608 and the front contact and left hand tongue of relay 607 to potential. This circuit holds relay 608 operated and the above grounded circuit is extended through the left hand tongue and front contact of relay 608 and the coil of relay 601 to potential. Relay 601 thereby operates and with relay 608 held operated, the circuit to the step magnet SM of rotary switch 603 cannot be recompleted and therefore the wipers thereof will remain on points corresponding to the marked or grounded point on its upper level.

As relay 601 operates, it completes a locking circuit for itself through its first right hand tongue, and extends the start circuit 310 from the intraoffice transmitter circuit through its second right hand tongue and front contact, fourth left hand tongue and front contact of relay 606, to the wiper on the lower or tenth level of rotary switch 603. Relay 601 also opens the circuit through its fourth right hand tongue to the turret switching lamp 501 whereupon the said lamp ceases to glow, and by its fifth right hand tongue and front contact completes a circuit from ground through right hand tongue and front contact of relay 606 and the coil thereof to maintain the same operated when the operating circuit thereof is subsequently interrupted. Through its outer right hand tongue, relay 601 opens the circuit through the coil of relay 607 whereupon said relay releases. Through its inner left hand tongue, relay 601 in operating opens the operating circuit to relay 602 and thereby prevents subsequent reoperation of relay 602, should the transmitter initiate key 214 be operated during the transmission of a message from the intraoffice transmitter circuit. Relay 602, however, does not immediately release since it is held operated at this time by other circuits. Through its second left hand tongue, relay 601 opens the circuit to the transmitter switching lamp 216 adjacent the transmitter 207 whereupon the lamp ceases to flash and through its outer left hand tongue opens one of the locking circuits for relay 602.

When the turret switching lamp 501 ceases to glow, the attendant is thereby informed that the actuated destination push button may be released and the release thereof opens the circuit to relay 502. Relay 502 thereupon releases and through its inner tongue removes ground from the circuit extending through the fifth right hand tongue and front contact of relay 602 which effected operation of relay 606. Relay 606, however, does not release since it is held operated by a previously described circuit. Through its outer tongue relay 502 in releasing opens the remaining locking circuit of relay 602 whereupon the latter relay releases. As relay 602 releases, it completes a circuit for causing the transmitter switching lamp 216 to glow steadily. This circuit extends from ground at the outer left hand tongue and front contact of relay 601 and the back contact and third left hand tongue of relay 602 to the transmitter switching circuit 311.

At this time the switching operation in respect to the first section of the turret connector is completed and relays 601 and 606 will be in an operated condition and the wipers of rotary switch 603 will be resting on the points corresponding to the point on the upper level thereof marked by the actuated destination push button. The various elements of this section of the turret connector will remain in these conditions until the end of transmission of the message stored in the tape 206 at which time they will be restored to their normal condition.

*Sending circuit*

Figure 20:
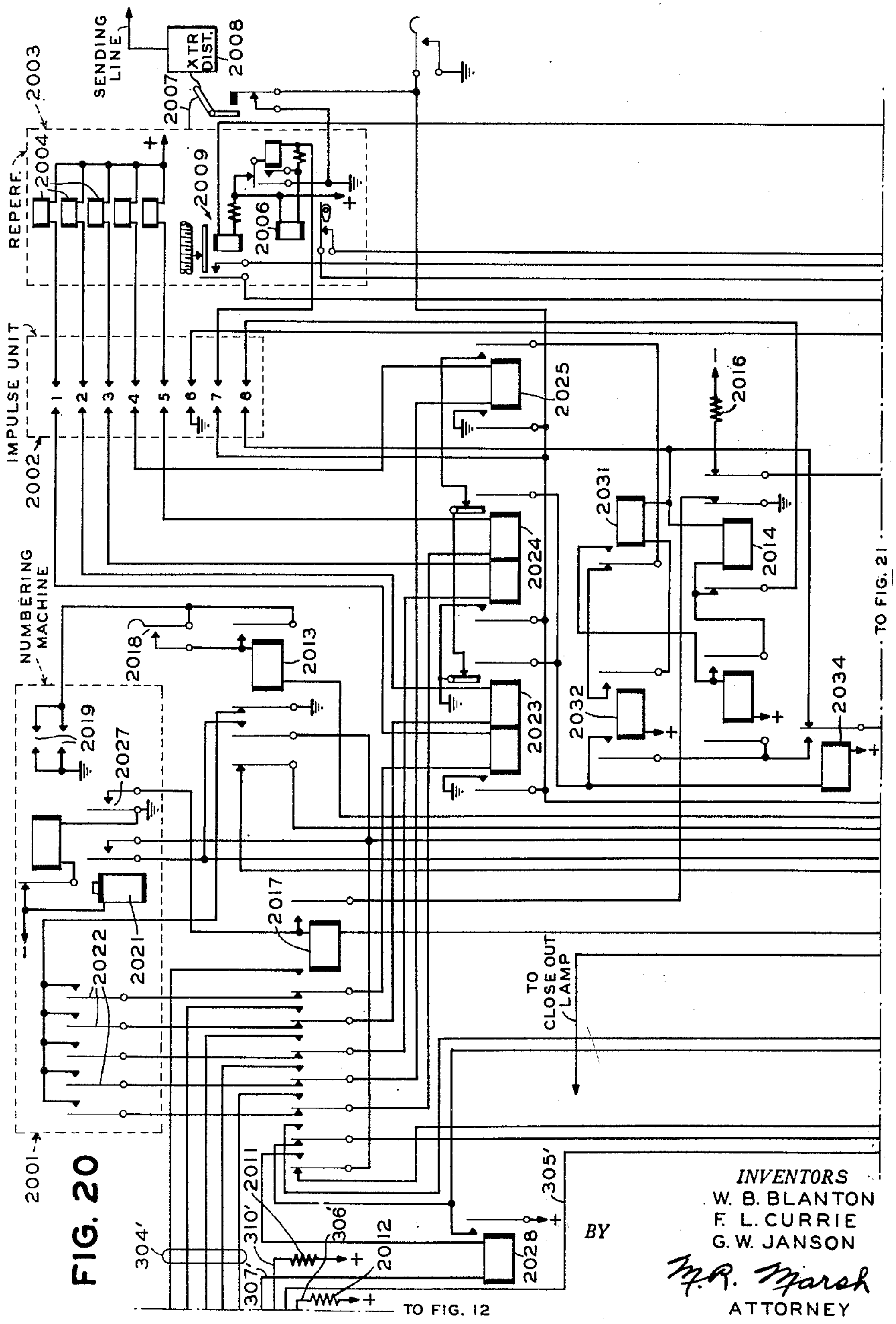
Figs. 20 and 21 are details of a so-called sending circuit employed in conjunction with the transmission of a message to a circuit outgoing from the switching center.
Figure 21:
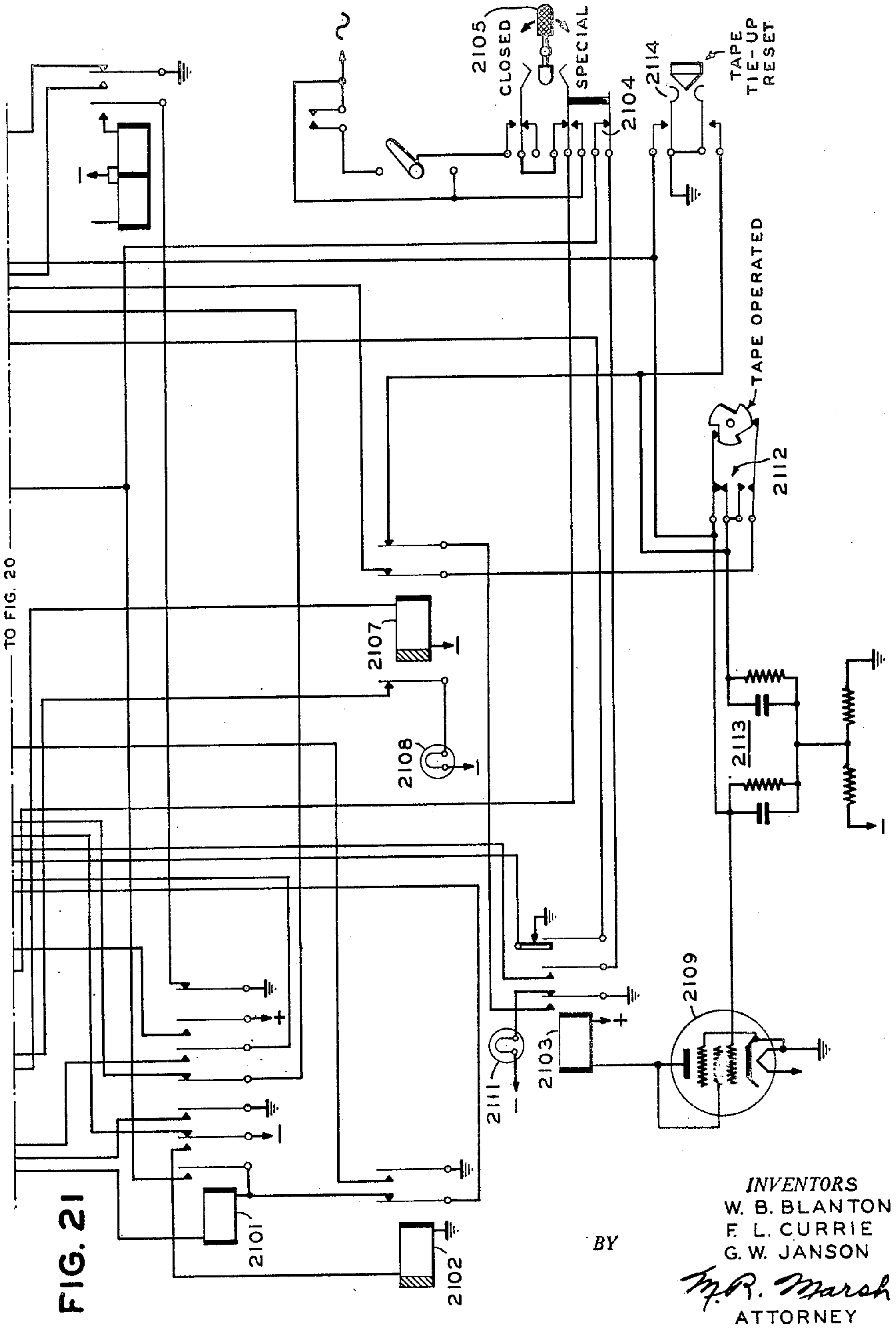

Each outgoing line or channel from the switching office has associated therewith a set of equipment and associated circuits such as that shown in Figs. 20 and 21 which are referred to collectively as a sending circuit or a sending position circuit. Such a circuit consists primarily of equipment for storing the message received over the intraoffice transmission path and subsequently transmitting it to the associated sending line.

Included in the equipment of the sending position circuit is a so-called numbering machine, an impulse unit, a reperforator and a transmitter distributor. The numbering machine is indicated generally by reference numeral 2001 and may be of the type disclosed in Patent No. 2,193,809 to Dirkes et al., granted March 10, 1940. The numbering machine 2001 is arranged to append to each message transmitted through the sending position a sequence number along with certain other information. The sequence number enables the ready tracing of lost and mutilated messages. The impulse unit 2002 consists of a set of contacts which operate in a predetermined sequence to time various functions of the sending position circuit and for other purposes hereinafter described.

The reperforator 2003 is preferably of the five magnet type having five selector magnets 2004 and a punch magnet 2006. The reperforator perforates a storage tape 2007 comprising the second storage of the system and the tape controls a transmitter-distributor 2008 for transmitting to the sending line impulses representative of the characters stored in the tape.

The sending position circuit of Figs. 20 and 21 also discloses a number of features, some of which are essential to the operation of the circuit and others of which are desirable from an operating standpoint. These features include a set of reading relays and a cooperating counting chain to detect the end-of-message signal appended to each message and automatically disconnect the intraoffice transmitter circuit therefrom at the end of a message. Also included in a tape tieup indicating means to indicate the failure of the tape 2007 to feed properly through the reperforator and to indicate when the tape supply is exhausted. A closeout key is also included which is operated when messages should not be sent to the particular sending position circuit, such as when the office at the distant end of the sending line is closed.

The reperforator 2003 may include a tape feedout arrangement indicated generally by reference numeral 2009 which cooperates with the reperforator to feed out a sufficient length of blank tape to enable the last message character perforated to reach the associated transmitter.

There is a sending position circuit such as that shown in Figs. 20 and 21 for each channel or circuit extending away from the switching center and each sending position circuit is connected to the sharing connector or the turret connectors by some nine conductors. As indicated in Figs. 6, 7, 8, 9 and 10, the so-called direct or directly connected sending circuits, of which in the arrangement shown there are thirty-four, are connected in parallel to the thirty-four sets of points of the turret connector rotary switches such as 603 and 604 by means of a cable 1000. The nine conductors leading into the sending position circuit, Fig. 20, include five signal conductors 304', a private circuit 305', and initial seize circuit 306', a transmitter step circuit 307' and a start circuit 310'. Nine such circuits or conductors terminate on each set of points of the second to tenth levels of switch 603 and the first nine sets of switch 604. For the present it will be assumed that the sending circuit, Figs. 20 and 21, are connected by cable 1000 to the first set of points of switch 603 upon which the wipers are at this time resting. Accordingly, the above enumerated nine circuits will, at this time, be extending through the turret connector from an associated intraoffice transmitter circuit such as that of Figs. 2 and 3.

With the exception of the start circuit 310, 310', all the nine circuits extending from the sending circuit into the intraoffice transmitter circuit are open. At the latter, the start circuit 310 extends through resistance 313 to ground in parallel with resistance 314 and the grid of a vacuum tube 316. At the sending position the start circuit 310' extends through a resistance 2011 to positive potential and this circuit is completed when relay 601 of the turret connector operates. Accordingly, shortly after the operation of relay 601, vacuum tube 316 will pass current to operate relay 317 in the plate circuit thereof. As relay 317 operates, it completes a circuit from ground through the front contact and outer right hand tongue, the inner right hand tongue and back contact of relay 301, the outer left hand tongue and back contact of relay 318, the second left hand tongue and front contact of operated relay 302, through a so-called standby lamp 217 to potential. This circuit causes lamp 217 to glow and inform the attendant that the intraoffice transmission path has been completed.

By its left hand tongue and front contact, relay 317 in operating completes a circuit from the point assigned to this particular intraoffice transmitter circuit on the circuit allotter 401, through the second left hand tongue and back contact of relay 318, the front contact and right hand tongue of relay 302, the right hand coil of so-called seize relay 319 to the initial seize circuit 306. As described, this circuit now extends through the associated section of the turret connector to the initial seize circuit 306' of the connected sending position circuit where it continues through a resistance 2012 to potential. Assuming that the sending position circuit of Figs. 20 and 21 is not connected at this time to some other intraoffice transmitter circuit, sufficient current will flow through the described initial seize circuit 306, 306' to cause relay 319 to operate when the circuit allotter 401 applies the ground to conductor 312. Relay 319 in operating locks up by a locking circuit extending from potential through its left hand coil, its left hand tongue and front contact, the continuity contacts 321 of relay 318, the front contact and inner right hand tongue of relay 319 to ground through the inner right hand tongue and front contact of relay 317. This ground also appears on the initial seize circuit 306 and 306' and in effect short-circuits relays, such as 319 of any other intraoffice transmitter circuits which may be or at some later time are connected to the same sending position circuit. Thus, a second intraoffice transmitter circuit cannot be connected to a seized sending position circuit. However, an intraoffice transmitter circuit attempting to establish a transmission path to a seized sending position circuit will have its relay 317 operated and in the manner hereinafter pointed out be automatically connected to the sending position when the one connected thereto releases the same. Since the circuit allotter 401 permits only one intraoffice transmitter circuit to seize a sending position circuit at a time any number of sending position circuits may be waiting for a particular sending position circuit and only one will be connected thereto at a time.

Operation of relay 319 places positive potential through its outer right hand tongue and front contact, the continuity contact 322 of relay 318, the coil of relay 301 on the private circuit 305. At the sending position, the private circuit 305' extends through the coil of a relay 2101, the back contact and inner tongue of a relay 2102, the back contact and outer left hand tongue of a relay 2103, the front contact and center tongue of a normally operated relay 2103, the lower contacts 2104 of a close-out key 2105 and the outer tongue and back contact of a relay 2104 and a resistance 2106 to negative potential. This private circuit is carried through a number of contacts that must be closed for any intraoffice transmitter circuit to make connection to a sending position circuit, any one of which may be open to prevent the connection when necessary.

The completion of the private circuit effects energization of relay 301 at the intraoffice transmitter circuit and relay 2101 at the sending position circuit and first will be noted the effect on the sending position circuit of operation of the former relay. Through its inner right hand tongue relay 301 in operating, opens the circuit to the standby lamp 217 adjacent the tape transmitter 207 which thereupon ceases to glow and indicates to the attendant that the desired transmission path has been established to the sending position circuit. Through its second left hand tongue and front contact, relay 301 extends the transmitter step circuit 307 through the inner right hand tongue and back contact of relay 213 and the right hand coil of a relay 218 to potential. The step circuit at this time is open at the front contacts at the outer left hand tongue of a relay 2017 at the connected sending position circuit. Through its outer left hand tongue relay 301 applies ground to an obvious circuit which later serves to lock relay 213 and 218 operated, both of which at the present time are unoperated.

At the sending position circuit the operation of relay 2101 by the completion of the private circuit 305' performs a number of functions. By its inner tongue relay 2101 in operating short-circuits a part of the described private circuit so that the same is independent of relays 2102 and 2103 and the contacts 2104 of key 2105 and thus prevents interruption of a connection once established from an intraoffice transmitter circuit to a sending position circuit until the end of the message. Through its second tongue relay 2101 opens the operating circuit to the numbering machine reset relay 2103 so that the numbering machine 2001 cannot be reset while the sending position circuit is seized. The numbering machine 2001 of an idle position sending circuit may be reset to an initial position by the operation of a key 2018 which causes operation of relay 2013 which locks up until the units and tens digit contacts 2019 of the numbering machine open. Through its second tongue relay 2101 also completes a circuit for operating relay 2102, the function of which will be evident hereinafter.

*Numbering machine operation*

The numbering machine 2001 is operated by impulses originating in the impulse unit 2002. The impulse unit 2002 is constantly operating to close its contacts in a predetermined sequence and in each cycle of operation, ground through the sixth from the top set or the so-called step contacts is applied through the outer tongue and front contact of relay 2103, the outer left hand tongue and back contact of 2017 to the front contact of the fifth tongue to the sending position seize relay 2101. The operation of relay 2101 extends this step circuit through the operating magnet 2021 of the numbering machine 2001 to potential so that each time the step contacts of the impulse unit close, the numbering machine 2001 will be operated through one cycle. The numbering machine 2001 includes a set of five tongues 2022 which are connected through the back contacts and the five inner left hand tongues of relay 2017 and coils of relays 2023, 2024 and 2025 to the left hand terminals of the upper five contacts of the impulse unit 2022. The other terminals of these five contacts extend through coils of the selecting magnets 2004 of the reperforator 2003 to potential. The front contacts associated with the tongues 2022 of the numbering machine are connected to ground, through a back contact of relay 2013.

The numbering machine 2001 operates the tongues 2022 to engage the associated front contacts in accordance with the character to be transmitted and the upper five contacts of the impulse unit closing in timed relation to the operation of the numbering machine cause the selecting magnets of the reperforator 2003 to be energized accordingly. This causes a character to be perforated in the tape 2007 corresponding to the setting of the tongues 2022 of the numbering machine and subsequently the closure of the sixth pair of contacts of the impulse unit reenergizes the operating magnet 2001 of the numbering machine to initiate the operation thereof for another cycle. Such cycles of operation of the numbering machine continue until it has completed its prescribed number and, incident to the last cycle, switch contacts 2027 momentarily close to complete a circuit for the operation of relay 2017. This circuit derives potential through the sixth tongue and front contact of relay 2101 and as relay 2017 operates it locks up by a circuit to ground including its right hand tongue and a back contact and relay 2104.

Through its first five left hand tongues relay 2017 in operating disconnects the numbering machine 2001 from the impulse unit 2002 and connects the five signal conductors 304' thereto and by its outer left hand tongue transfers the connection from the step contacts of the impulse unit, heretofore extending to the numbering machine, through the coil of relay 2028 to the transmitter step circuit 307'. The sending position circuits of Figs. 20 and 21 is now in condition to receive the intraoffice transmission of intelligence impulses through signal conductors 304' and supply the transmitter, such as 207, of the connected intraoffice transmitter circuit with step pulses. As each code group is received over the signal conductors 3041, the reperforator 2003 operates to correspondingly perforate the tape 2007 and these message signals appear in the tape 2007 immediately following the signals from the numbering machine 2001.

*Transmission of message intraoffice*

Under the assumed conditions relays 302, 301, 317 and 319 of the intraoffice transmitter circuit, Figs. 2 and 3, are operated at the time the transmitter step impulses begin to be received over the transmitter step circuit 307. Accordingly, the first transmitter step pulse, which consists of a grounded pulse applied to the circuit of conductor 307, will extend through the front contact and second left hand tongue of relay 301, the inner right hand tongue and back contact of relay 213 and the right hand coil of relay 218 to potential. This first step pulse as it is received at the intraoffice transmitter circuit thereby effects operation of relay 218. As relay 218 operates the above circuit is extended through the left hand coil, the front contact and left hand tongue of relay 218, the coil of relay 213, the back contact and second tongue of relay 212 in parallel with a reset key 219 to ground at the front contact and outer left hand tongue of relay 301. Relay 213 included in this circuit, however does not operate until the ground is removed from the step circuit 307 as that ground shunts the circuit through the coil of relay 213 and the left hand coil of relay 218. When the step circuit ground is removed relay 213 operates and together with relay 218, locks up for the time being.

Thus the first step pulse received over circuit 307 effects operation of relays 213 and 218 with relay 213 not operating until the end of this pulse. As relay 213 operates, the five outer left hand tongues extend the signal conductors 304 to the tongues of the tape transmitter 207 and the inner left hand tongue maintains ground on the operating circuit for relay 302 to hold it operated. Through its inner right hand tongue relay 213 transfers the step pulse circuit from the right hand coil of relay 218, to a circuit through the coil of relay 221 to a point 222 where the circuit divides into parallel paths, one path including contacts 223 and the right hand coil of relay 224 and the coil of the step magnet SM of tape transmitter 207. The other parallel path from point 222 includes the left hand coil of relay 224, the front contact and inner left hand tongue of relay 301, the inner left hand tongue and back contact of relay 212, tape lever contacts 209, the upper contacts of key 211 and the coil of the step magnet SM. Thus the step circuit is extended to the step magnet SM of the tape transmitter 207 and as long as both of the above-described parallel paths are maintained, relay 224 will not operate as the two coils thereof are in opposition.

The absorption of the first step pulse received at the intra-office transmitter circuit without advancement of the tape permits the first character of the message over the pins of the transmitter to be transmitted while the subsequent step pulses advance the tape to permit the following perforations to be sensed and representative code signals transmitted. The interruption of the parallel circuit through the left hand coil of relay 224, as by the opening of the tape lever contacts 209 due to taut tape, or the operation of the tape tieup relay 212, causes the step magnet SM to be held energized by a circuit including the right hand coil of relay 224, and its right hand tongue to ground at the inner left hand tongue of relay 213. If the operation of relay 224 is caused by the energization of relay 212, the lamp 226 has its circuit completed to apprise the attendant of the tape tieup condition.

After an operation of relay 224 due to the opening of the tape lever contacts 209 as the result of a tight tape condition, the accumulation of more tape will permit the tape lever contacts to reclose. The next step pulse will then be effective through the left hand coil of relay 224 to oppose the effectiveness of the circuit through the right hand coil and thereby cause release of relay 224. Accordingly following step pulses will be applied to the step magnet SM of the tape transmitter 207 to advance the tape.

All step pulses but the first pass through the coil of relay 221 to energize the same which in operating interrupts a circuit from potential through the coil of relay 227 and the front stop and inner left hand tongue of relay 318 which at this time is grounded through a front contact of relay 301. Relay 227 is slow to release and normally remains in an operated condition so that it holds open the circuit from ground at the outer right hand tongue and front contact of relay 213, the back contact and tongue of relay 227, and the coil of relay 212 to potential. Accordingly the tape tieup relay 212 is normally unoperated. Signal lamps 228 and 229 together with signal lamp 226 are illuminated as the result of various conditions in the circuits of the intraoffice transmitter circuit. These lamps inform the attendant of the existence of various trouble conditions.

*Release of sending circuit*

The transmission of signals stored in the tape 206 of the intraoffice transmitter circuit continues in the manner pointed out above until the transmission of a message is completed at which time the transmission path is automatically interrupted and the sending circuit made available for seizure by other intraoffice transmitter circuits. The automatic release of the sending circuit is effected by the transmission of an end-of-message signal over the intraoffice path. In the arrangement shown an end-of-message signal consisting of two consecutive periods or code groups wherein the fourth pulse only is marking effects the release.

As noted above, the five signal conductors 304′ in the sending position circuit extend through the coils of relays 2023, 2024 and 2025 so that the said relays are operated in various combinations in accordance with the code group of signals transmitted over these conductors. The intraoffice transmission of a period effects operation of only relay 2025 of the above three and at such times a circuit is completed from ground through continuity contacts of relays 2023 and 2024, the right hand tongue and front contact of relay 2025, the tongue and back contact of a relay 2031, and the coil of a relay 2032 to potential. Relay 2031 thereupon operates which together with relays 2032 2014 and 2033, are included in a counting chain for counting the period combinations. As relay 2032 operates it conditions relay 2031 for operation when relay 2025 releases. As relay 2031 operates it locks up by a circuit through its coil and the coil of relay 2032, a back contact of relay 2034 and a front contact of relay 2102 and transfers the circuit from the right hand tongue of relay 2025 to the coil of relay 2033. Accordingly if only relay 2025 operates for the next transmitted code combination, relay 2033 will be operated and it in conjunction with the eighth set of contacts of the impulse unit 2002 subsequently causes relay 2014 to operate. Operation of relay 2014 opens the locking circuit through its inner right hand tongue for relay 2017 and by its outer right hand tongue opens the private circuit 305 and 305′ extending through the coils of relay 2101 at the sending circuit and relay 301 in the intraoffice transmitter circuit. The release of relays 2017 and 2101 in the sending circuit and the release of relay 301 in the intraoffice transmitter circuit initiates the return of these circuits to their normal idle condition.

If the character following a single period is any other than another period or a blank, either one or both relays 2023 and 2024 will be operated to complete an obvious circuit for operating relay 2034. The operation of this relay opens the circuit through which relays 2031 and 2032 are locked up in response to a single period combination. Accordingly the release of the sending position circuit is only initiated when the double period end-of-message signal is received.

The release of relay 2017 in conjunction with the receipt of an end-of-message signal at the sending circuit interrupts the step pulse circuit previously extending through relay 2028 so that the said relay will not be operated by the step pulses and it in turn will not periodically complete the circuit for slow-to-release relay 2107 included in the tape tieup control circuit. Accordingly relay 2107 will release but its release will not effect illumination of the Transmitter Stopped lamp 2108 since this circuit will now be open at a front contact of relay 2107.

The release of relay 2107 also applies a ground at the inner tongue of relay 2103 and front contact thereof to the grid of vacuum tube 2109 so that the said tube continues to pass plate current and maintain relay 2103 operated. Accordingly the tape tieup lamp 2111 will not operate at this time. Normally the tape tieup lamp 211 is illuminated on the failure of the tape to feed properly through the reperforator 2003 and this is effected by relay 2103 which releases when vacuum tube 2109 ceases to pass plate current. Vacuum tube 2109 will pass plate current as long as the tape operated contacts 2112 in conjunction with the grid leak circuit 2113 maintain the grid near ground potential. Should the reperforator 2003 operate and the tape fail to advance, tape operated contacts 2112 will not apply ground to the grid of tube 2109 and the condensers in the grid leak circuit 2113 will discharge and after a time, governed by the consonants of the grid leak circuit, permit the grid to become negative. Thereupon vacuum tube 2109 will effect release of relay 2103 and cause tape tieup lamp 2111 to be illuminated. After the elimination of the tape tieup condition, the attendant may operate the tape tieup reset key 2114 to restore the circuits.

As relay 301 in the intraoffice transmitter circuit releases in response to an end-of-message signal as above set forth, the inner right hand tongue thereof applies ground from a front contact of relay 317 through the outer left hand tongue and front contact of relay 318 to the transmitter disconnect circuit 308. This ground is applied before relay 318 releases when the locking circuit thereof is opened by release of relay 301. Through its outer right hand tongue relay 301 applies a ground to the start circuit 310 and also interrupts various other circuits which effects restoration of the intraoffice transmitter circuit to its normal condition.

The application of a ground to the transmitter disconnect circuit 308 short-circuits the coil of relay 601 in the associated section of the turret connector whereupon the said relay releases and opens the locking circuit through relays 606 and 611 which also release and cause the circuits of this section to be restored to their normal condition. Incident to the release of a connected intraoffice transmitter circuit, the ground applied to the initial seize circuit 306, 306′ removed and therefore any intraoffice transmitter circuit awaiting connection to the released sending circuit will be connected thereto when the circuit allotter 401 grounds the allotter circuit such as 312 of the waiting intraoffice transmitter circuit.

At times an attendant may desire to release a sending position circuit after it has been seized and the transmission path established thereto from the intraoffice transmitter circuit. Such releasing or disconnecting may be accomplished by the attendant operating a release key, such as 231, in the intraoffice transmitter circuit to apply ground to the transmitter disconnect circuit 308. Such a ground shunts the coil of relay 601 of the associated section in the turret connector to effect release and initiate a disconnect function in the same manner that the release of relay 301 initiates a disconnect on the transmission of an end-of-message signal. The release key 231 can be operated at any time and hence the operation thereof will effect the disconnect function at any time regardless of whether the transmission path has been completed through the turret connector or during the transmission of a message. Release key 231 would normally be operated when faulty transmission or reception or absence of an end-of-message signal failed to initiate the automatic release of the sending position circuit.

The attendant after operating a transmitter initiate key, such as 214, of an intraoffice transmitter circuit, which as described seizes control of the turret connector to the exclusion of the other associated intraoffice transmitter circuits, may desire to switch a message from one of these other intraoffice transmitter circuits before switching the message in the tape of the circuit which has seized the turret connector. As will be recalled the operation of a transmission initiate key 214 effects operation of a relay, such as 602, of its associated section and prevents operation of other such relays until the establishment or registering of the transmission path to the desired sending position circuit. To effect immediate release of any one of the relays, such as 602, a turret clear-out key 503 is provided which applies ground to the operating circuit for such relays to thereby short-circuit the coil and effect release thereof. Thereupon the turret connector is restored to its idle condition and the transmitter initiate key of another intraoffice transmitter circuit may be operated to seize control of the turret connector.

*Operation of destination push buttons Nos. 26 to 34*

In the arrangement disclosed rotary switches, such as 604, 704 and 804, of the various sections of the first turret connector are employed to establish transmission paths to any of the sending position circuits represented by destination push buttons 26 to 34. Such destinations are assigned to the first nine points on these rotary switches and the other sixteen points thereon are employed to establish paths through various ones of the rotary switches employed in the sharing connector. As a sharing connector is used by a number of turrets, three in the arragement indicated in the drawings, it is necessary when a transmission path is to be established through a rotary switch 604, 704 or 804, that control of the equipment shared by other turrets be gained to prevent the possibility of misrouting of messages should an attendant at another turret simultaneously attempt to establish a transmission path to a sending position circuit served by the sharing connector.

Figure 10:
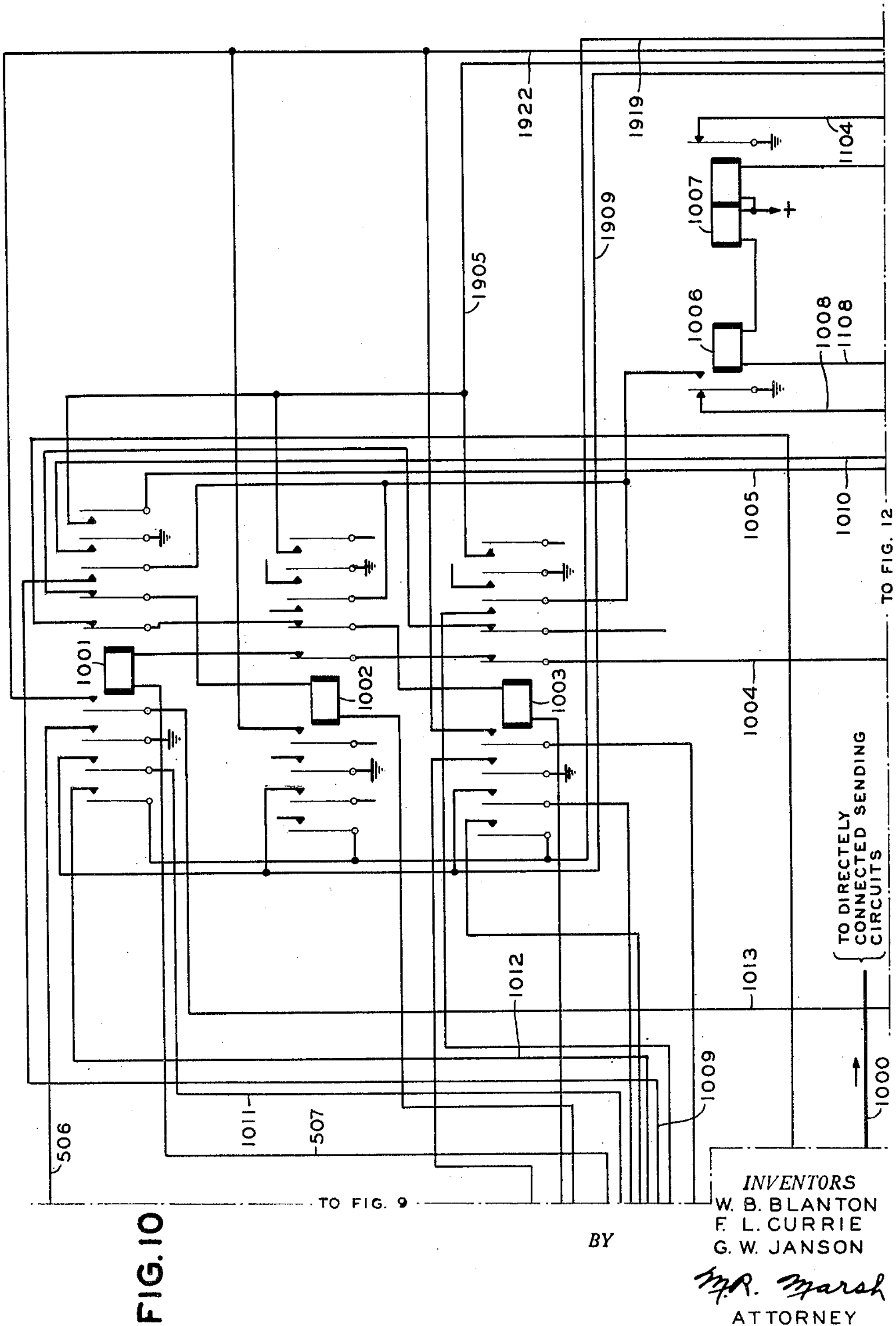
Figure 11:
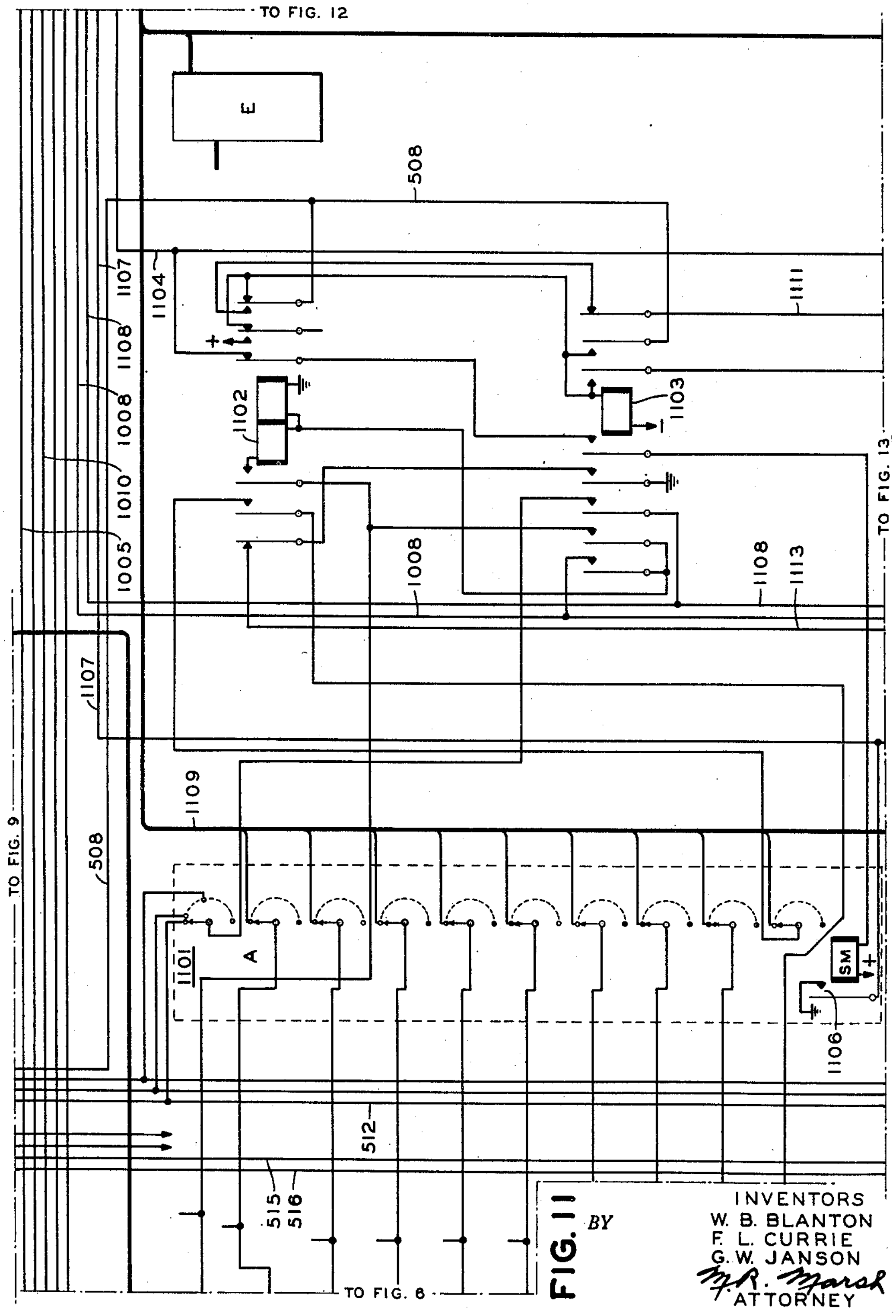
Figure 12:
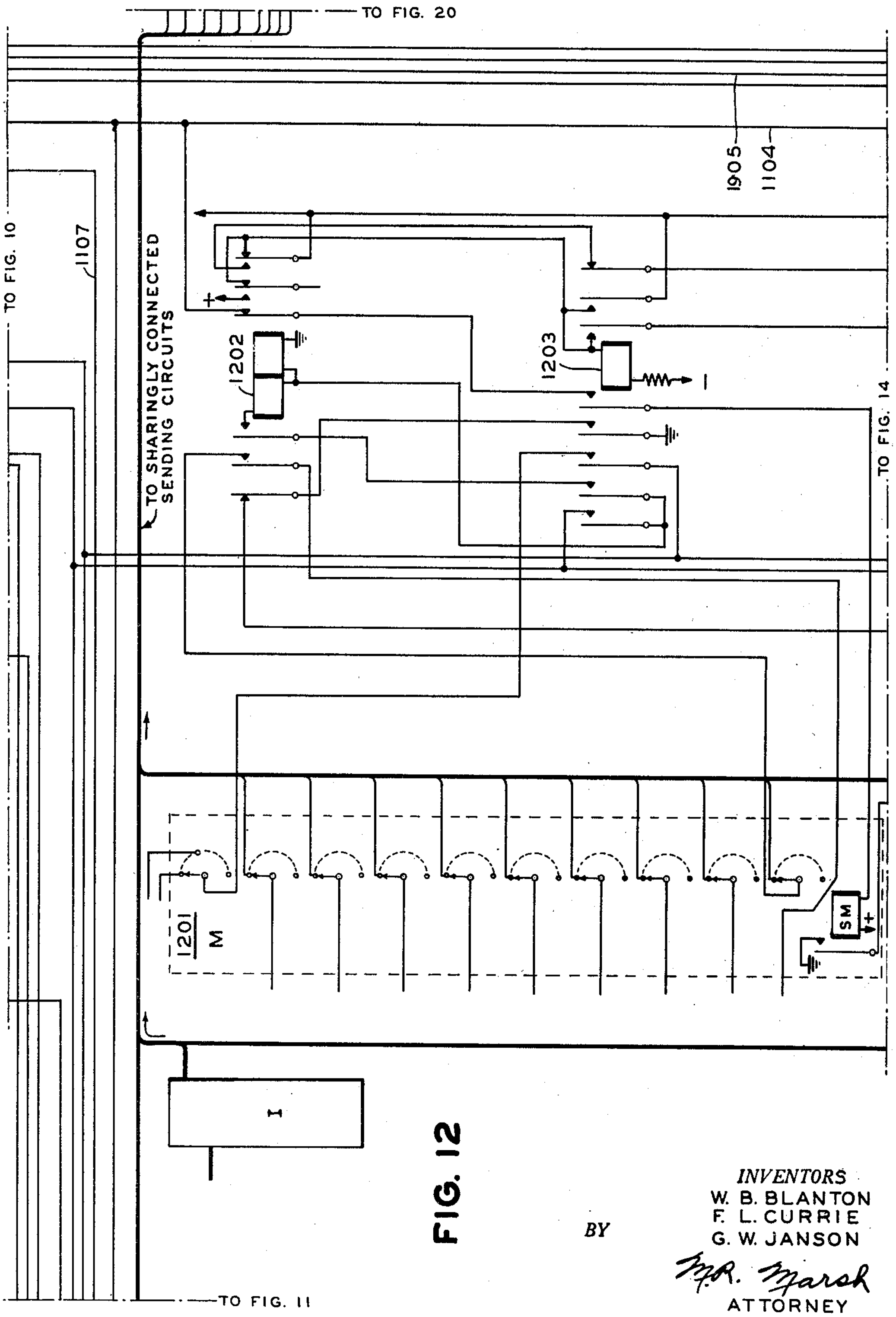
Figure 13:
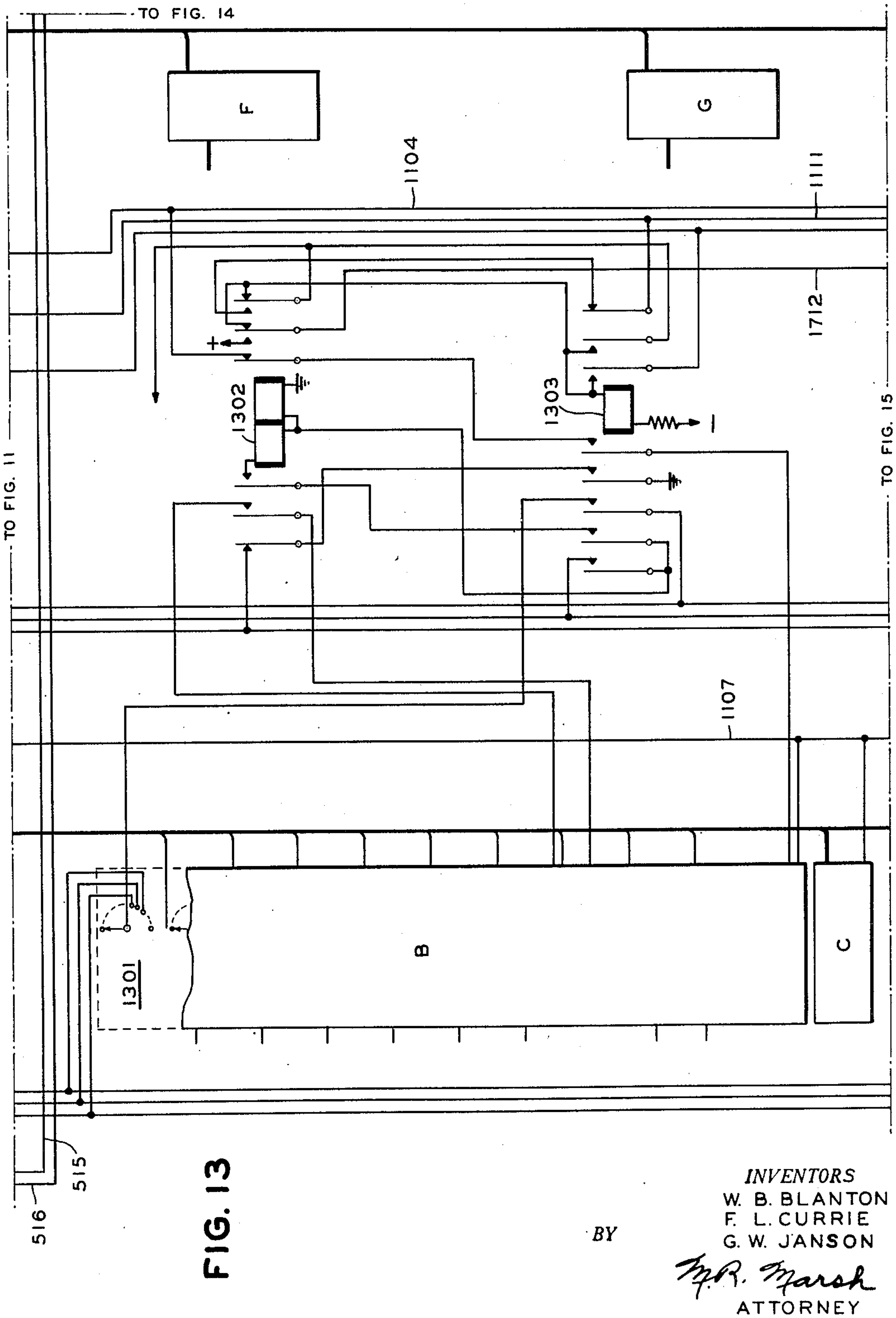
Figure 14:
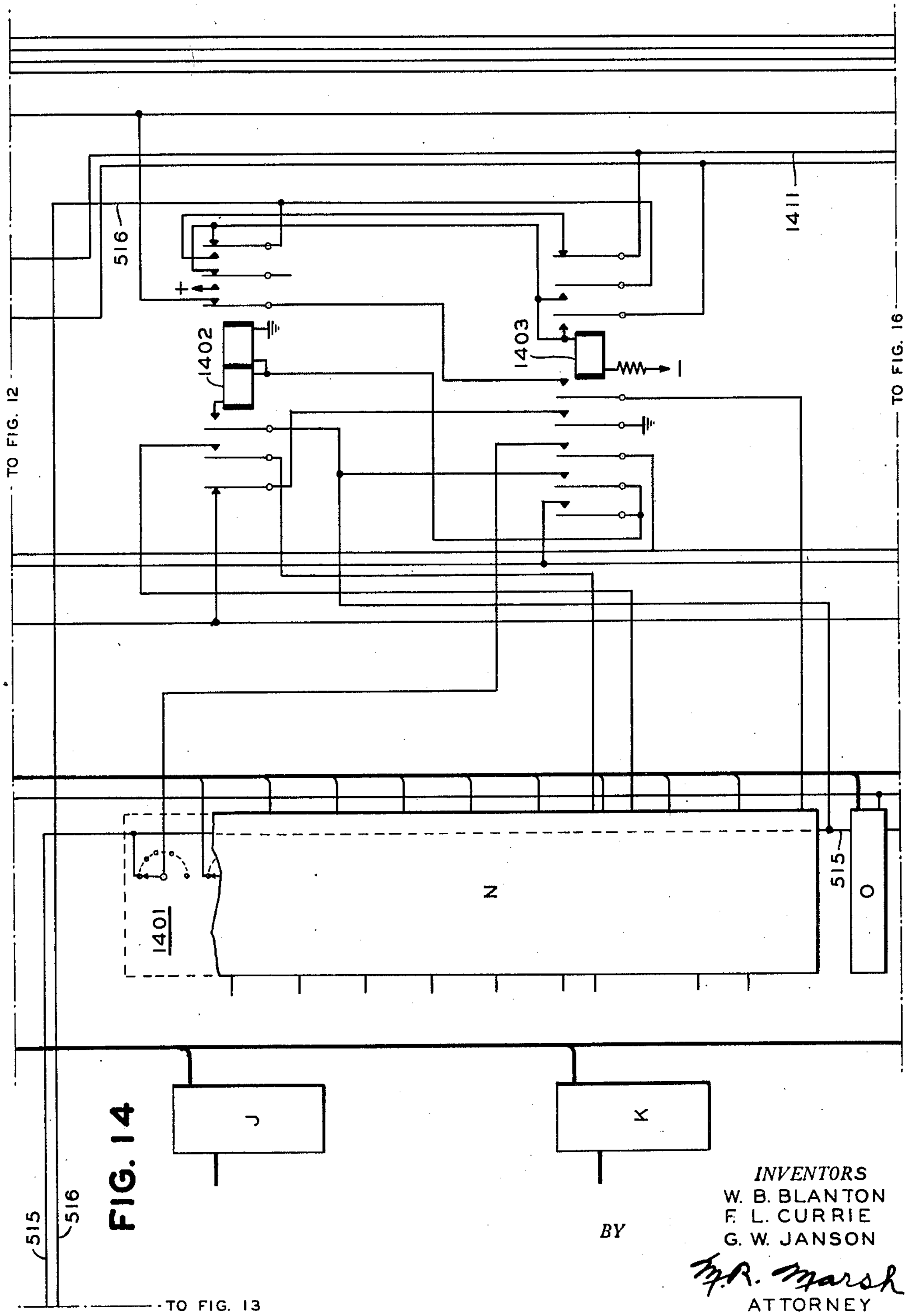
Figure 15:
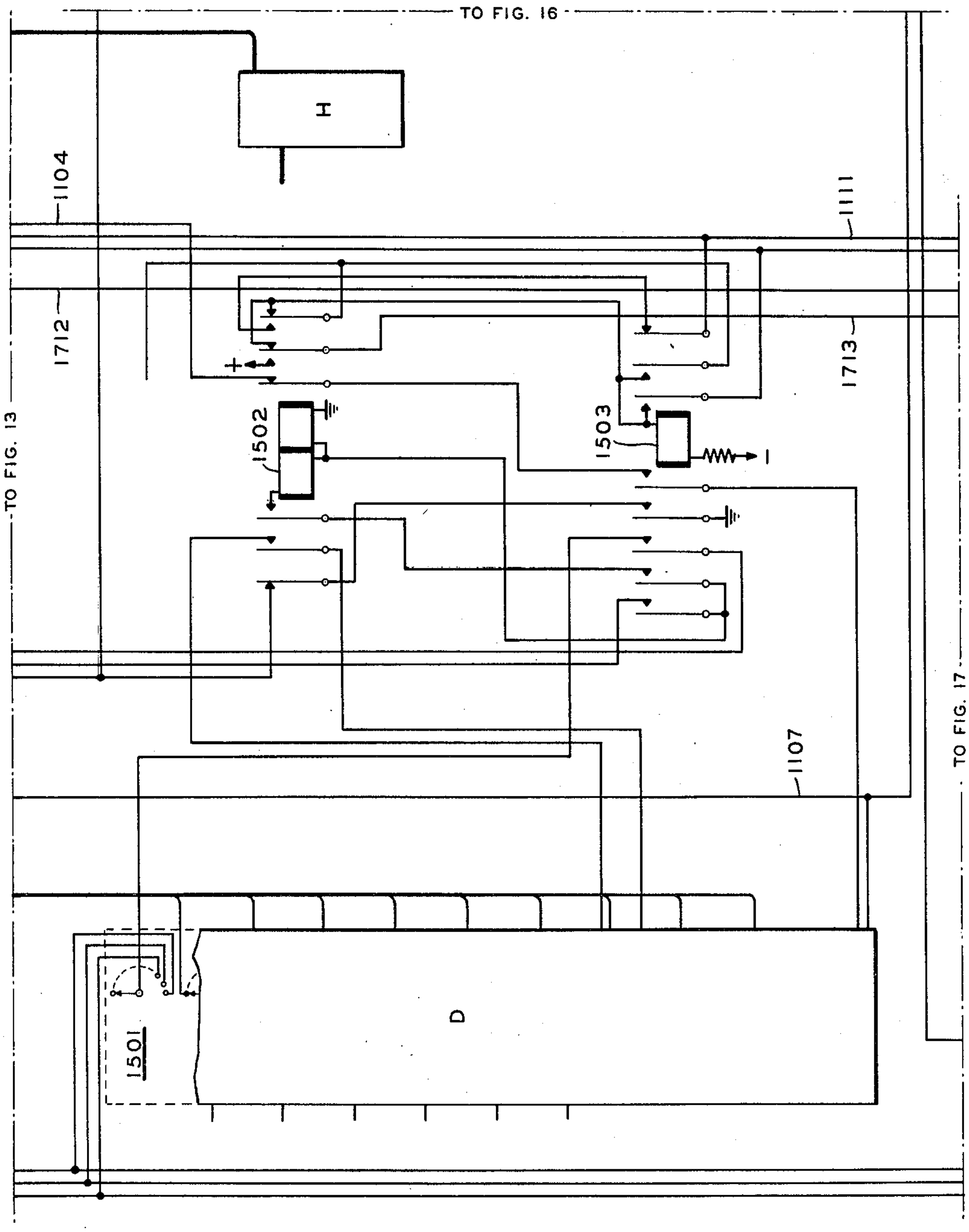
Figure 16:
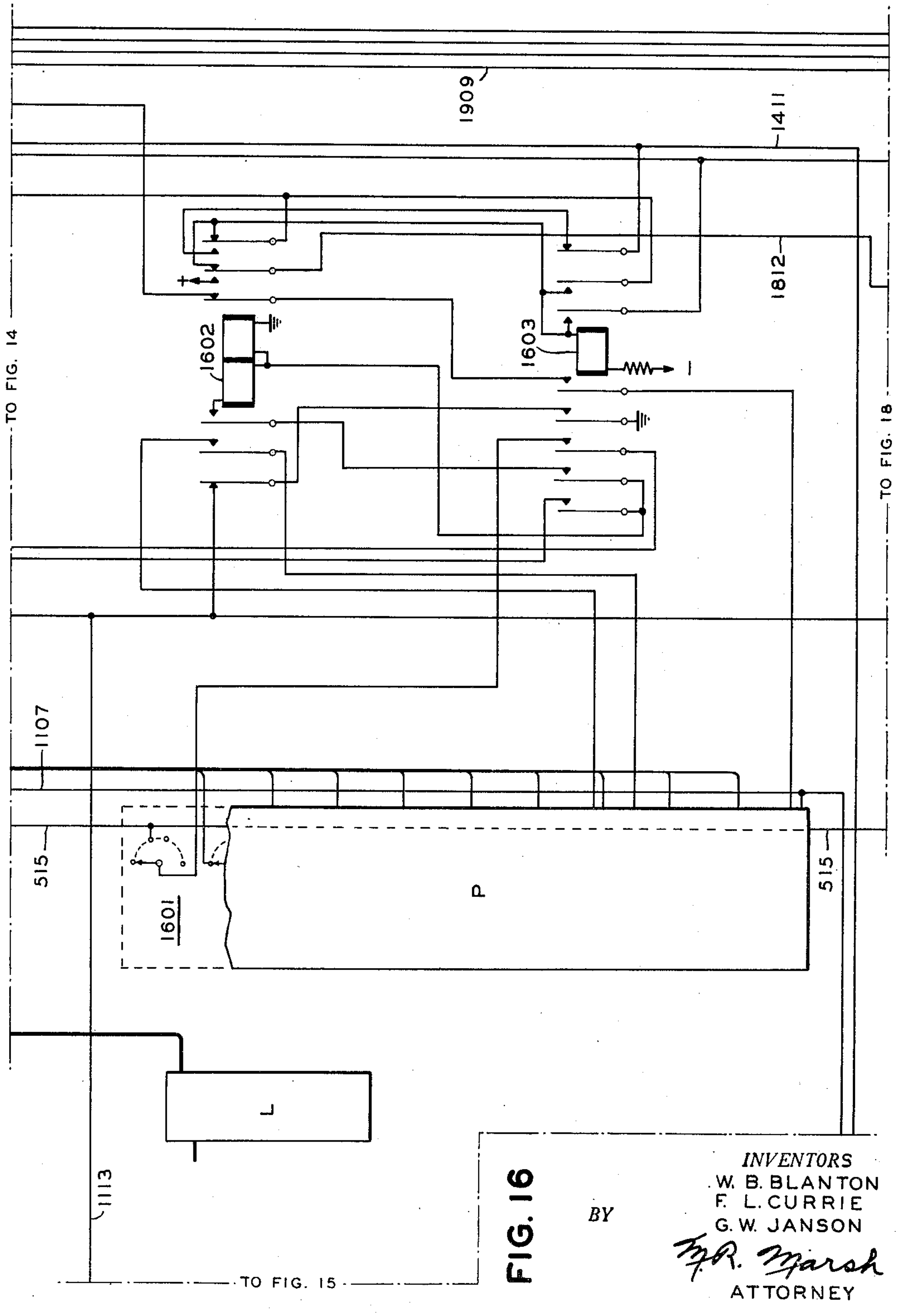

To enable each turret of a group associated with a sharing connector to exclusively gain control of the common sharing equipment, there is provided a relay for each turret, the operating circuit of which extends through a tongue and back contact of each of the other such relays. With this arrangement only one of these relays can be operated at a time and Fig. 10 shows an arrangement of three such relays 1001, 1002 and 1003 with the first relay being associated with No. 1 turret, the second with No. 2 turret and the third with No. 3 turret. The manner in which these so-called turret relays 1001, 1002 and 1003 function in the establishment of transmission paths to sending circuits represented by turret push buttons 26 to 34 as well as the sending circuits connected through the sharing connector or those represented by turret push buttons 35 to 194, will be described hereinafter.

For the present it will be assumed that a message at the intraoffice transmitter circuit of Figs. 2 and 3 is intended for the destination represented by push button 26, a directly associated sending circuit. The circuits for this sending circuit, as pointed out, are connected to the first set of points of rotary switches, such as 604, 704 and 804 of each turret connector. Since the message is to be switched through a so-called direct circuit there will be no functional operation of the common sharing equipment but it will be temporarily disabled to prevent one of the other turrets from employing the same during the establishment of the desired transmission path.

As the attendant observes the presence of a message in the intraoffice transmitter circuit and notes the destination thereof, she first operates the transmitter initiate key, such as 214, and thereby, provided the associated turret is idle, seizes control of the turret to the exclusion of the other associated intraoffice transmitter circuits. The circuit functions of the turret and the intraoffice transmitter are the same as described above in connection with the switching of a message to a sending position circuit represented by the No. 1 destination push button and these descriptions will not be repeated. The attendant will next operate the destination indicating push button No. 26 corresponding to the assumed destination. Whenever any one of the destination push buttons Nos. 26 to 34 is operated, the upper contacts complete a circuit for operating relay 504. The lower elements of the lower contacts of each of these push buttons are connected to respective points on the upper or marking levels of rotary switches 604, 704 and 804. The upper elements of these contacts of push buttons 26 to 34 as well as those of push buttons 35 to 194, representing the sharingly served destinations, are connected in multiple by conductor 506 to a front contact of turret relay 1001, the associated tongue of which is grounded. Accordingly, the marking points on the rotary switches will not be grounded until the associated turret relay is operated. Operation of relay 504 as the result of actuation of push button 26 applies potential at the left hand tongue thereof to conductor 507 and a circuit extending through the coil of turret relay 1001, and back contacts of turret relays 1002 and 1003, conductor 1004 and the tongue and front contact of relay 602 to ground. If it is assumed that turrets No. 2 and No. 3 are idle at this time, turret relay 1001 will operate to apply a ground to the described circuit through the lower contacts of push button 26 for marking the first point on rotary switches 604, 704 and 804.

In addition to furnishing a ground for the operated one of the destination push buttons, such as 26, for marking a point on rotary switch 604, turret relay 1001 through its first and second right hand tongues opens the operating circuits for turret relays 1002 to 1003 so that these relays can not be operated from their respective turrets. Relay 1001 in operating also completes a circuit for holding relay 602 locked up in the same manner that operation of relay 502 held relay 602 locked up when push button No. 1 was actuated. This latter locking circuit originates at ground on the tongues of relays 1903 and extends through the back contacts thereof, conductor 1905 and back contact and outer right hand tongue of relay 1001, conductor 1005, to the first left hand tongue and front contact of relay 602. Relay 1001 also completes a circuit from ground through its fourth right hand tongue and front contact, conductor 1010, the third right hand tongue and front contact of relay 602, the outer right hand tongue and back contact of relay 601, through the coil of relay 607 to potential. This circuit causes operation of relay 607 which, as described previously, applies battery to the locking or left hand coil of relay 608, and completes the circuit for the step magnet SM of rotary switch 604 to cause the same to operate and advance the wipers thereof until the marked point on the upper or marking level is reached. Following this operation, relay 601 is caused to operate in the manner pointed out and from here on the operation of the involved section of the first connector is substantially the same as that described in connection with the operation of destination push button No. 1. However, there is one distinction in that during the operation in connection with the actuation of destination push button 26, relay 606 remains unoperated as the various wipers of rotary switch 604 are connected to back contacts of relay 606, the tongues of which extend to the associated intraoffice transmitter circuit. Except for the above and other obvious differences the turret connector functions in the same manner as that first described and includes the operation of the various signal lamps to inform the attendant of the progress and establishment of the transmitting path through the equipment involved.

The extinguishing of the turret switching lamp 501 on the completion of the establishment of the transmission path informs the attendant that the depressed destination push button No. 26 may be released. The release of the push button opens the first to relays 504 and 1001 and the latter releasing opens the locking circuit to relay 601. At this time only relay 601 remains operated and it is not released until the transmission of the end-of-message signal. As relay 602 releases on the release of the destination push button, the common equipment of the first turret is made available for the other associated intraoffice transmitter circuits, and turret relay 1001 also releasing at this time, makes the common equipment of the sharing connector available for the intraoffice transmitter circuits of the other associated turrets as well as those associated with turret No. 1. Thus the common equipment of a turret connector as well as that of a sharing connector are exclusively seized only during the establishment of the transmission path which normally takes but a small fraction of a second, and this common equipment is then available for the establishment of other transmission paths during the transmission of the message over the first established path.

*Operation of destination push buttons 35 to 194*

The destination indicating push buttons 35 to 194 control the establishment of transmission paths through the so-called sharing connector. In the preferred embodiment the sharing connector is common to a plurality of push button turrets and consists primarily of a plurality of rotary switches and associated sets of relays. In the embodiment of the invention illustrated in the drawings, particularly Figs. 11 to 16, inclusive, there are indicated some sixteen separate sections in the sharing connector identified as A, B, C, and so forth to P. All sections are substantially identical and each section includes a ten level rotary switch and associated control relays. Some of the sections are shown in complete detail while others are indicated diagrammatically.

The rotary switches of the various sections of the sharing connector have 25 points on each level and if each set of points on each of the 16 switches extended to a separate sending circuit, a total of 400 different sending circuits could be served. However, in a manner pointed out hereinafter, some of the sending position circuits, so-called three-appearance circuits, are so arranged that a transmission path may be established thereto through any one of three different sections of the sharing connector. Other so-called two-appearance circuits may have a transmission path established thereto through either one or the other of two different sections of the sharing connector. The number of appearances of a sending circuit is ordinarily determined by the expected traffic to such a circuit, those having three appearances being expected to have more traffic than those having only two. As indicated in the drawings, the 160 destination push buttons Nos. 35 to 194 are associated with the sharing connector and arranged so that the first appearances of ten sending position circuits appear on each of the rotary switches in the 16 sections of the sharing connector.

The operation of the sharing connector is such that the intra-office transmitting path is established through the rotary switch having the first appearance of the desired sending position circuit if this rotary switch is not busy by having some other intra-office transmission path established therethrough. If the first appearance rotary switch is busy, the transmission path is established through the second appearance rotary switch if the second is idle, otherwise the path is established through the rotary switch having the third appearance, if there are three appearances of the desired sending position circuit. If the rotary switches having all the appearances of a sending position circuit, either two appearances or three appearances as the case may be, are busy, a turret busy signal lamp is illuminated to inform the attendant of this condition. In that event switches may be made from other intra-office transmitter circuits which can be effected through idle rotary switches of the sharing connector or to the directly associated circuits.

In accordance with the principles of operation, as set forth above, it will be assumed that the sending position circuits of destination indicating push buttons 35–44 have their first appearance on the first ten sets of points of rotary switch 1101 in the first or section A of the sharing connector. It will further be assumed that these ten sending position circuits have their second and third appearances on points of rotary switches 1301 and 1501 in sections B and D, respectively, of the sharing connector. In addition to the first appearances, rotary switch 1101 will also have a number of second and third appearances on the points thereof and likewise rotary switches 1301 and 1501 will have first and third, and first and second appearances thereon of other sending position circuits. The arrangement of these appearances is not necessarily in accordance with a predetermined plan other than with the object of sharing the load evenly among the various rotary switches in the sharing connector.

In the following it will be assumed that push button 35 of turret No. 1 is actuated and that section A of the sharing connector functions to establish the desired transmitting path to the representative sending position. As in the above-described operations, the destination indicating push button 35 is not operated until after the operation of the transmitter initiate key, such as 214, of the intra-office transmitter circuit having the message to be relayed. The operation of the transmitter initiate key as described, causes its associated turret section relay, such as 602, to operate and with this relay operated, the depression of destination push button 35 completes a circuit for operating the associated turret relay 1001. This circuit originates at ground at the front contact and outer right hand tongue of relay 602 and extends over conductor 1004, through the inner right hand tongues and back contacts of turret relays 1003 and 1002, the coil of turret relay 1001, conductor 507, the upper contacts of push button 35, conductor 508, the outer right hand tongue and back contact of relay 1102 in section A of the turret connector and the coil of relay 1103 to potential. Accordingly, the relay 1103 will operate provided either of turrets 2 or 3 is not at this time establishing a transmission path through the sharing connector and further provided that relay 1102 of section A of the sharing connector is not operated. Relay 1102 will be operated when section A has a transmission path established therethrough. As is obvious from the drawings, the operation of push button 35 of turrets 2 and 3 likewise will effect operation of relay 1103 and either one of their respective turret relays 1002 or 1003.

The sixteen sections of the sharing connector are associated with the last sixteen sets of points on the various levels of rotary switches 604, 704 and 804 in each of the three turret connectors and as relay 1103 operates, its fifth and fourth left hand tongues and front contacts complete a circuit from ground through the left hand tongue and back contact of relay 1006 to the tenth point on the upper marking levels of these rotary switches. The ground on the marking level of the rotary switch in the activated section of a turret connector, which for the assumed conditions is rotary switch 604, determines where the wipers thereof will stop. In addition, operation of relay 1103 completes a stepping circuit from ground through the tongue and back contact of relay 1007, conductor 1104, back contact and inner right-hand tongue of relay 1102, front contact and inner left hand tongue of relay 1103 and the coil of step magnet SM of rotary switch 1101 to potential, and prepares the cut-off circuit to relays 1006 and 1007 for stopping the wipers of switch 1101 as soon as the marked point is reached.

Another function performed by the operation of relay 1103 is to complete a circuit from ground through its second left hand tongue and front contact, the outer left hand tongue and back contact of relay 1102, conductor 1113, and the coil of relay 1918 to potential, causing said relay to operate. As relay 1918 operates its outer tongue applies ground to conductor 1919 and through the outer left hand tongue and front contact of turret relay 1001, conductor 1012, and the turret switching lamp 501 to potential to thereby maintain the turret switching lamp illuminated when the first operating circuit thereto through a front contact of relay 602 is interrupted on the release of the latter relay. Similarly, operation of any of the other relays such as 1103 in various other sections of the sharing connector establishes a circuit for maintaining the turret switching lamp 501 illuminated.

The closure of the lower contacts of push button 35 and the operation of associated turret relay 1101 applies ground through the second left hand tongue and front contact of this relay, conductor 506, the closed contacts of the push button, conductor 512 to a corresponding point on the upper marking levels of the rotary switches of the various sections of the sharing connector through which the desired destination or sending circuit can be reached. For the assumed arrangement, operation of push button No. 35 will mark or apply a ground to a point of the upper levels of rotary switches 1101, 1301 and 1501 in sections A, B and D, respectively, of the sharing connector. As this marking circuit can not be completed until after the involved turret relay, such as 1101 operates, which in turn can not operate until the common sharing equipment is available, such points will not be marked unless the sharing connector is available. As it is assumed that the desired transmission path is to be established through the section of the first appearance, or section A of the sharing connector, only the marked point in this section will be considered at this time and with the marking of the points on rotary switches 604 and 1101 and the completion of the stepping circuits to their respective stepping magnets, they start to step. The wipers of either rotary switch may reach its marked point first and it will be assumed that the wipers of switch 604 reach their marked point first.

The stepping of rotary switch 604 is effected in the manner previously pointed out through operation and release of relays 607 and 608. When the wipers of rotary switch 604 reach the marked point, which in the assumed case will be the tenth point, a circuit is completed from ground through the tongue and back contact of relay 1006, conductor 1008, the front contact and outer left hand tongue of relay 1103, the fourth tongue and front contact of this relay, to the tenth point and wiper on the upper marking level of rotary switch 604, the outer tongue and back contact of relay 611, the back contact and third tongue of relay 606, the front contact and fourth tongue of relay 602, the left hand winding of relay 608 and the front contact and left hand tongue of relay 607 to battery. This circuit maintains relay 608 operated and prevents further stepping of the rotary switch 604. At this time another circuit extends from the front contact of the left hand tongue of relay 608 through the winding of relay 601 to battery for operating the latter relay which locks up through its inner right hand tongue.

The operation of relay 601, as previously described, extends a number of circuits through contacts thereof and interrupts various other circuits.

The energizing circuit for the step magnet SM of rotary switch 1101 extending through the inner left hand tongue and front contact of relay 1103, the inner right hand tongue and back contact of relay 1102, conductor 1104 and the tongue and back contact of relay 1007 is interrupted by the operation of the latter relay. Relay 1007 is operated by a circuit extending from ground at the interrupter contacts 1106 of rotary switch 1101, conductor 1107 and the coil of relay 1007 to battery each time the step magnet SM operates and such operation and release of the step magnet continues until the wiper of the upper or marking level reaches the marked point, which for the assumed case is the No. 1 point. When the wipers reach this point the ground thereat is extended through the front contact and third left hand tongue of relay 1103, conductor 1108, the coil of relay 1006 and the left hand coil of relay 1007 to potential. This circuit holds relay 1007 operated and prevents further stepping of the wipers of rotary switch 1101 and also operates relay 1006.

As relay 1006 operates, the shunt circuit to ground in parallel with the right hand coil of relay 1102 is interrupted and thereby places this coil in the marking circuit of rotary switch 604 whereby relay 1102 is caused to operate.

As relay 1102 operates it opens the circuit to relay 1918 which releases and opens the circuit to the turret switching lamp 501. The attendant on observing the turret switching lamp go out may then release the actuated destination indicating push button such as 35 to open the circuits to relays 1001 and 1103. These relays thereupon release and they in turn cause the release of relays 602, 1006 and 1007 and make the common sharing connector available for seizure and use by another associated intra-office transmitter circuit.

Each set of the last sixteen points on rotary switch 604 are multipled to corresponding points on other such switches and with the exception of the marking level and the start circuit level, or the first and tenth levels, respectively, extend to corresponding wipers of rotary switches, such as 1101 of sections A to P of the sharing connector. Corresponding points on these similar levels of rotary switches such as 1101 of the sixteen sharing sections extend by means of cable 1109 to the various sending position circuits. Thus, each rotary switch such as 1101 in the sharing connector accommodates some 25 sending position circuits some of which, in addition to being first appearances, may also be second and third appearances of other sending circuits. The start circuit for section A of the sharing connector extends from the tenth point of the lower level of rotary switch 604 to the second left hand tongue of relay 1102. The associated make contact is connected to the wiper of the lower or start level of rotary switch 1101 and this circuit is completed when relay 1102 operates. Accordingly, at this time the five signal conductor circuits, the private circuit, the initial seize circuit, the step circuit and the start circuit will be completed between an intra-office transmitter circuit and a sending position circuit, and if the sending position circuit is available transmission of the message will begin as described above.

The double period at the end of the message will effect release of the involved section of the sharing connector and the circuit which first serves as the marking circuit for rotary switch 604, and next as the operating circuit for relay 1102, is also used as the clear-out circuit for the involved section of the sharing connector.

As set forth, the end-of-message signal effects release of relay 601 which opens the locking circuit through its third right hand tongue to the coil of relay 611. The latter relay was operated when relay 1006 operated by a circuit from ground at the tongue of relay 1106 through the third right hand tongue and front contact of turret relay 1001, conductor 1009, the back contact and right hand tongue of relay 504, the sixth right hand tongues and front contacts of relays 602 and 601, the second left hand tongue and back contact of relay 611 to potential. The release of relay 611 through its outer tongue removes battery from the circuit extending through the coil of relay 1102 and hence this relay releases and at this time the involved section of the sharing connector will be in its idle condition.

As indicated in the drawings, each section of the sharing connector is connected in multiple by some ten conductors to corresponding sets of points on each rotary switch such as 604 of each section of the turret connectors associated therewith. For example, section A of the sharing connector is connected to the tenth set of points of rotary switch 604 which points are also multipled to corresponding points on rotary switches in each of the other sections of the turret connectors. To prevent interference with the normal operation of another switch such as 704, when the wipers thereof step onto a set of points representing a busy section of the turret connector they must pass over these points as they would if the points were not in use. To effect this result the flow of current through a busy marking point on a rotary switch such as 604 is limited to a value below that which will permit operation of the relays in a second marking circuit. To illustrate the manner in which the circuits operate, first let it be assumed that the wipers of rotary switch 604 reach the points corresponding to the marked point on the upper marking level thereof before the wipers of rotary switch 1101 in section A of the sharing connector reach their marked points when a transmisison path is being established from the first section of the No. 1 turret connector through section A of the sharing connector. When the wipers of rotary switch 604 reach the marked point, the flow of current through a circuit originating at ground on the tongue and back contact of relay 1006 and conductor 1008, contacts of relay 1103, the marked point and wiper of the upper level of rotary switch 604, back contacts of relays 611 and 606, front contacts of relay 602, the left hand coil of relay 608, front contacts of relay 607, and through a resistance 601 to potential, is sufficient to hold relay 608 operated and to operate relay 601.

As relay 601 operates it completes a circuit for the operation of relay 611 which in turn transfers the marking circuit through rotary switch 604, through resistance 610 to potential. Resistance 610 is considerably less than resistance 611 and accordingly at this time more current will be permitted to flow in the marking circuit and through the marking level of rotary switch 604.

Subsequently rotary switch 1101 of section A of the sharing connector will reach its marked point and through circuits described effect operation of relay 1006. Operation of relay 1006 removes the shunt to ground around the right hand coil of relay 1102 whereupon this relay operates. At this time the resistance 610 and the resistance of the right hand coil of relay 1102 limit the flow of current in the marking circuit through the marking level of relay 604.

The operation of relay 1102 opens the circuit to the coil of relay 1103 whereupon the latter releases and in turn removes the shunt around the left hand coil of relay 1102. The left hand coil of relay 1102 has a comparatively high resistance and it being introduced into the marking circuit still further reduces the current flow therethrough to a value only a fraction of what it was perviously but sufficient to hold the relay operated.

With the limited flow of current in the marking circuit through the connected level of rotary switch 604, the stepping of the wipers of another section of a turret connector to corresponding points or those multipled thereto will not permit sufficient current to flow through the parallel section to operate its associated relay such as 608. This is because the resistance 610 plus the high resistance of relay 1102 left coil in the connected section is so much larger than the resistance 611 in the section seeking a connection, and the wipers of a rotary switch in the second section of a turret connector will pass over such points as though they had been idle. Accordingly a second section of the turret connector will not interfere with the normal operation of any established transmission path even though points of the various levels thereof are multipled together.

*Alternate assignor*

As pointed out, each sending position, such as the one of Figs. 20 and 21, when associated with or served through the sharing connector have two or three appearances or the circuits thereof are multipled to two or three sets of points on the rotary switches in different sections of the sharing connector. The transmission path to the sending position is established through the section of the sharing connector having the first appearance, if this section is idle, and through the section having the second appearance when the section having the first appearance is busy. Similarly, when the section having the second appearance is also busy, the path is established through the section having the third appearance. If the three appearances of a three-appearance sending circuit and the two appearances of a two-appearance circuit are busy, a "turret busy" signal lamp is caused to glow to advise the switching attendant of the temporary busy condition of all the sections of the sharing connector having the desired appearances.

Figure 17:
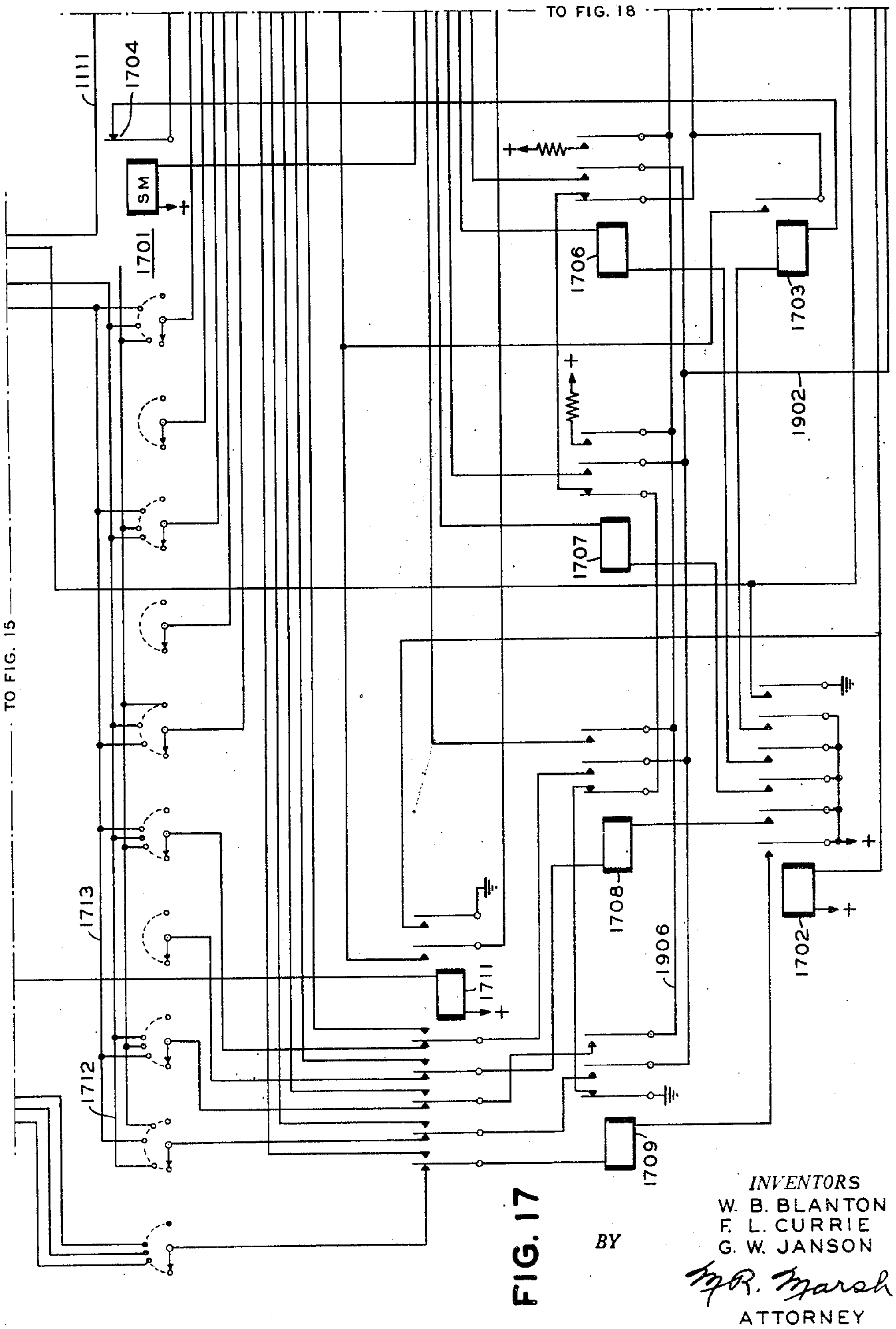
Figure 18:
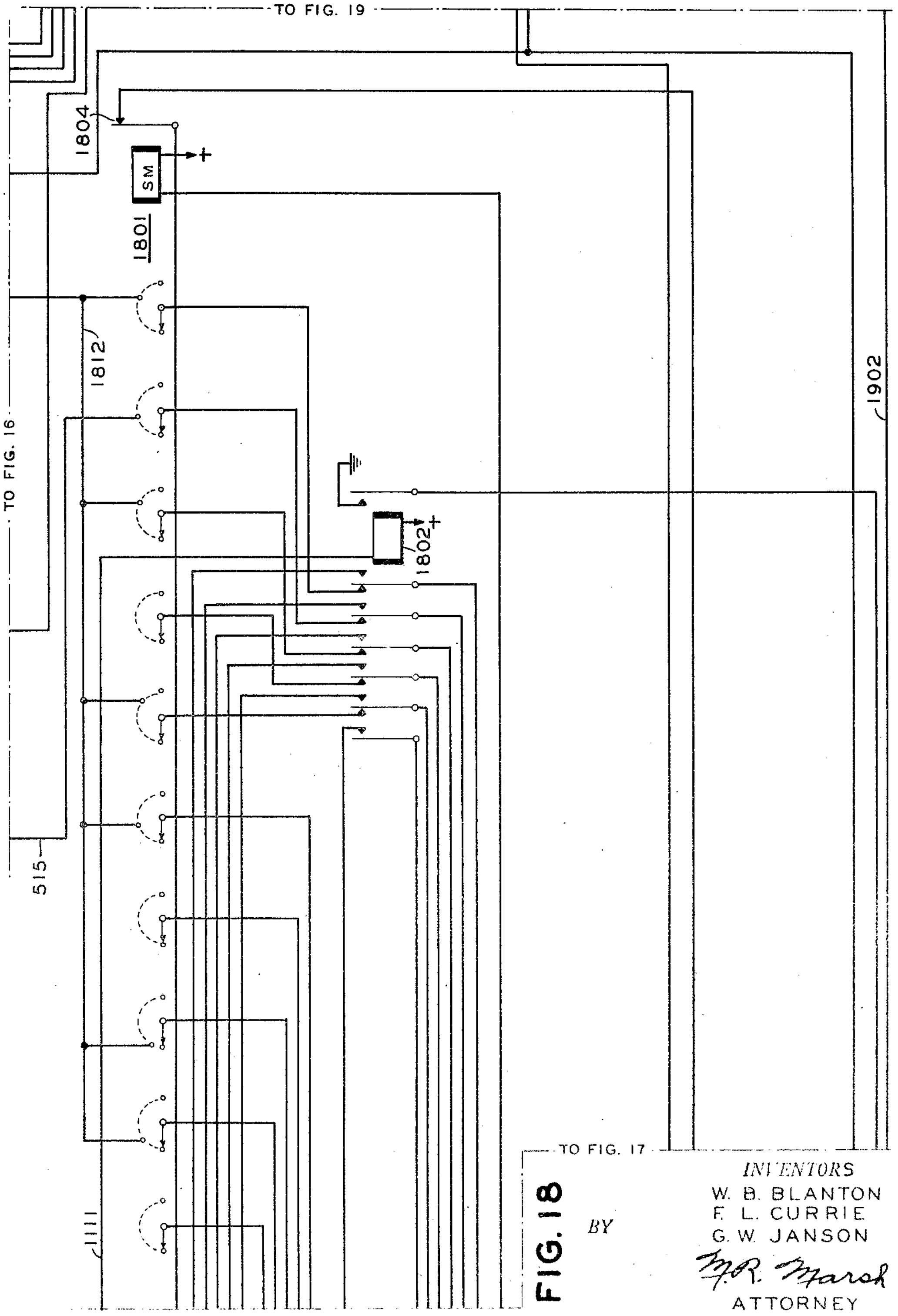
Figure 19:
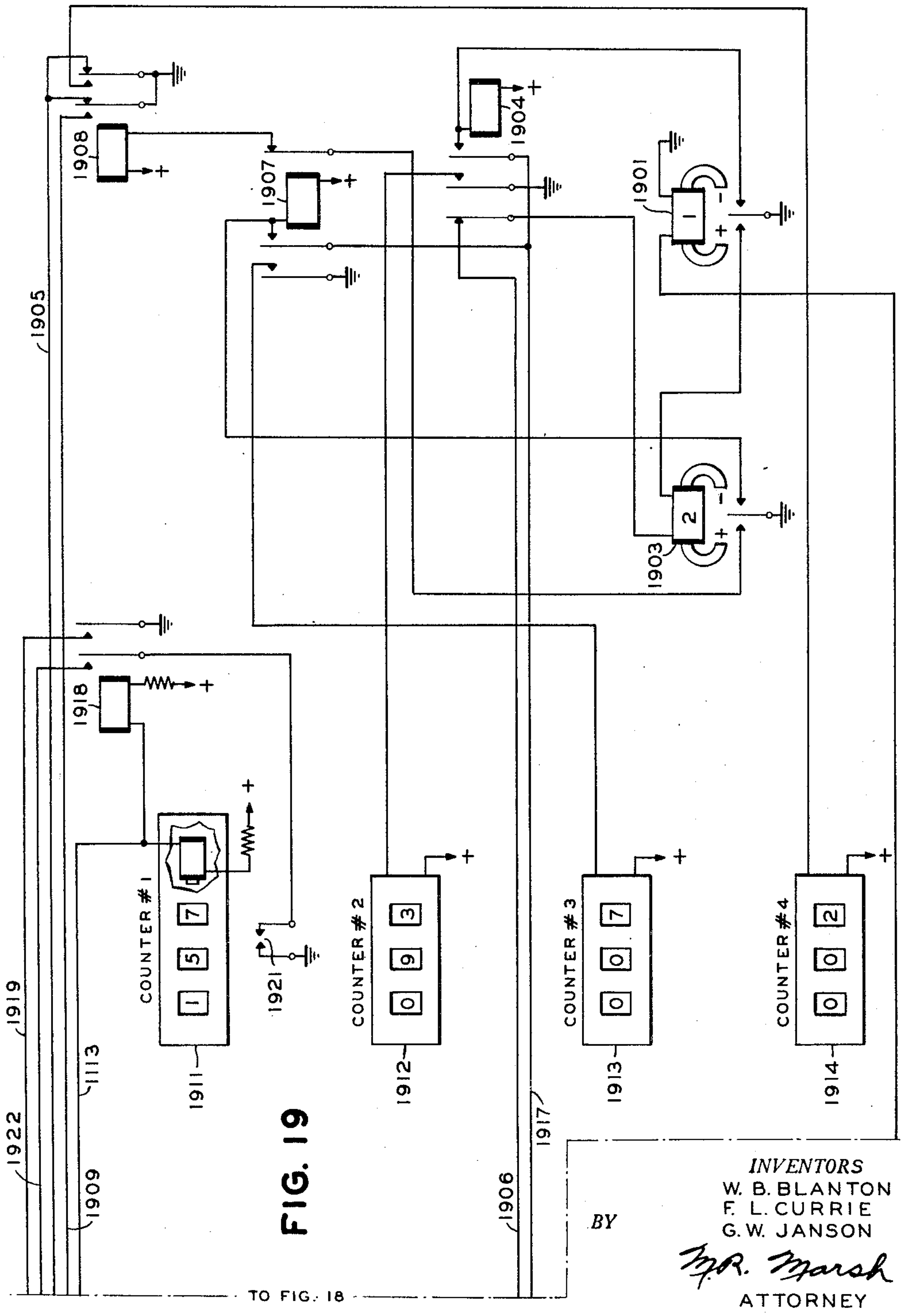

A so-called alternate assignor functions to direct the establishment of the desired transmission paths through the alternate appearances and the manner in which it operates will now be described. For the present it will be assumed that section A of the sharing connector having the first appearance of the desired sending position is busy and that the second appearance is in section B and is idle. As shown in the drawings, destination push button No. 35 representing, for example, a three-appearance sending circuit, is arranged to mark a point in each section of the sharing connector through which the representative sending circuit may be connected. Accordingly, for the assumed condition push button 35 marks a point on the upper or marking level of rotary switches 1101, 1301 and 1501 in sections A, B and D of the sharing connector as well as a point on the first or left hand level of an alternate assignor rotary switch 1701. There is a pair of alternate assignor rotary switches 1701 and 1801 and the various levels thereof are divided into groups. In the embodiment shown in Fig. 17, rotary switch 1701 has the first three levels in one group, the fourth, fifth and sixth in a second group, the seventh and eighth in a third, and the ninth and tenth in a fourth. The first two of these groups provide for directing the second and third appearances of some 25 three-appearance sending positions, and the third and fourth groups for some 25 two-appearance sending positions. Hence, an alternate assignor rotary switch such as 1701 or 1801 may provide for directing the alternate connections to some 100 sending positions or circuits. The first switch level of each group is the marking level for that group and each contact thereof is multipled to the marking points on the marking levels of the associated sections of the sharing connector and to the marking contacts of the representative destination push button.

The second level of each group of levels on the alternate assignor rotary switches 1701 and 1801 is used to direct the request for a transmission path to any one of the 25 outlets associated with the group to its second appearance sharing section when the first appearance sharing section is busy. Similarly, the third level of each group of levels in the three-appearance group is used to direct the request to the third appearance sharing section when the first and second appearance sharing sections are busy. When a request for a connection is directed to a second or third apperance sharing section, that section will start operation and complete the connection in the same manner as has been described for the first appearance.

Since there are 16 sections in the sharing connector and the points of the rotary switch included in each sharing section have connected thereto second and third appearances of some sending circuits as well as first appearances of others, a control connection must be provided between each of those sections and the second and third level of each group of levels of the alternate assignor rotary switch for directing the operation of those sections when the second or third appearances are required. Each of the 16 control connections are multipled among the points of the second and third levels of each group of the alternate assignor rotary switches in whatever order necessary to place the control of its sharing section at every alternate assignor point where an alternate connection may be directed to a sharing section. Accordingly, the second and third level points of each group will be multipled into 16 separate circuits. For example, the alternate assignor start circuit from the first sharing section will be multipled to one or more points of the first, fourth, seventh and ninth levels of both alternate assignor rotary switches 1701 and 1801, and the number of these multiple connections will be the number of second or third appearances arranged on the rotary switches of the various sections.

In the following description it will be assumed that the turret section relay 602 is operated and that when the destination push button such as 35 is depressed, the section of the sharing connector such as section A having the first appearance of the desired sending circuit is busy or already has a transmission path therethrough. When a section of the sharing connector such as section A is busy, relay 1102 will be operated and relay 1103 unoperated. Accordingly, at such times the above described circuit entering section A of the sharing connector by conductor 508 and which would otherwise operate relay 1103, is diverted through the outer right hand tongue and front contact of relay 1102, the back contact and outer right hand tongue of relay 1103, to conductor 1111, and through the coil of relay 1802 to potential. As described, this circuit also includes the coil of turret relay 1001, and accordingly this relay and relay 1802 will now operate.

Relay 1001 in operating functions as described to seize the sharing connector and relay 1802 in operating completes an obvious circuit for operation of relay 1702. As relay 1702 operates its fifth right hand tongue and front contact completes a circuit from potential through the coil of a relay 1703, the interrupter contacts 1704 and 1804 of rotary switches 1701 and 1801, the inner tongues and back contacts of relays 1706, 1707, 1708 and 1709, to ground. Relay 1703 thereupon operates and completes a circuit from ground now at the inner right hand tongue of relay 1706, through contacts of relay 1703, the front contact and outer left hand tongue of relay 1802, the coil of the step magnet SM of rotary switch 1701 to potential thereby energizing the step magnet. As the step magnet energizes the contacts 1704 open the circuit through relay 1703 which in turn interrupts the step magnet circuit whereupon it releases and advances the wipers. These operations of the step magnet SM of rotary switch 1701 continue until the wiper of the first or left hand level reaches the marked or grounded point, at which time a circuit will be extended through the wiper, the back contact and outer left hand tongue of a relay 1711, the coil of relay 1709 and the front contact and inner tongue of relay 1702 to potential. This circuit effects operation of relay 1709 which interrupts the above described circuit through the coil of relay 1703 to stop further stepping of the wipers of the rotary switch.

The operation of relay 1709 also completes a circuit from ground through the coil of polar relay 1901, conductor 1902, the second tongue and front contact of relay 1709, the fourth tongue and back contact of relay 1711, the wiper of the second level from the left of rotary switch 1701, conductor 1712, the second tongue and back contact of relay 1302 and the coil of relay 1303 to negative potential. Relays 1302 and 1303 will be in unoperated condition since section B of the sharing connector is assumed to be idle and the above circuit, which may be termed the second appearance circuit, effects operation of relay 1303 and causes the tongue of polar relay 1901 to move from its normal midposition to its right hand contact. The operation of relay 1303 completes a circuit, including conductor 1104, for the energization of the step magnet of rotary switch 1301 and starts it to seeking the marked point on the upper level thereof in the same manner that relay 1103 in operating initiated operation of the step magnet of its associated rotary switch 1101.

Further operation of the relays of section B of the sharing connector is similar to that described above in connection with section A and incident to the operation of these relays a representative point is marked on the upper level of rotary switch 604 and this switch is initiated into the seeking of this marked point. When rotary switches 604 and 1301 reach the marked points, the start circuit is completed and the transmission path established in the same manner as pointed out above.

With section B of the sharing connector busy at the time of the completion of the above described second appearance circuit, its relay 1302 would be energized and positive potential at the front contact of the second right hand tongue of this relay would be applied to conductor 1712. This positive potential through the coil of polar relay 1901 would cause the tongue to move from its neutral midposition to its right hand stop and thereby complete a circuit from ground at the tongue through the coil of a second polar relay 1903, the tongue and back contact of relay 1904, conductor 1906, the outer tongue and front contact of relay 1709, the third tongue and back contact of relay 1711, the wiper and contact of the third level from the left of alternate assignor rotary switch 1701, conductor 1713, to the second right hand tongue of relay 1502, assuming section D of the sharing connector is the one having the third appearance of the desired sending circuit. If section D is idle at this time, the above circuit which may be called the third appearance circuit, will be extended through the back contact of relay 1502 and the coil of associated relay 1503 to negative potential. This negative potential on the third appearance circuit causes the tongue of polar relay 1903 to move from its normal midposition to its right hand contact and also operates relay 1503. The operation of the latter relay actuates or initiates section D of the sharing connector into operation to establish the desired transmission path therethrough in the same manner as operation of relays 1103 and 1303 initiated operation of their respective sections. Obviously, as section D is activated a corresponding point on rotary switch 604 is marked so that the wipers thereof will stop on the points associated with section D.

Had section D of the sharing connector also been busy, positive potential would have been applied through the second right hand tongue of relay 1502 to the third appearance circuit 1713 which would be effective on polar relay 1903 to move the tongue from its normal midposition to its left hand contact. Such operation of relay 1903 completes an obvious circuit through the right hand tongue and back contact of relay 1907 and the coil of relay 1908 to potential to cause the latter relay to operate. The operation of relay 1908 completes a circuit from ground at its inner tongue over conductor 1909 and through the third left hand tongue of the operated one of the turret relays, which is assumed to be relay 1001, conductor 1011, the turret busy lamp 511 of push button turret No. 1, to potential, thereby causing this lamp to glow and inform the attendant that the sections of the sharing connector having all the appearances of the desired sending circuit are at the moment busy. Relay 1908 in operating also removes ground from the above described circuit which caused operation of relay 607 in the seized section of the first turret connector and thus prevents useless stepping of rotary switch 604.

The attendant on seeing the turret busy lamp 511 light may thereupon either release the actuated destination indicating push button or hold the button depressed. Holding the button depressed will cause the transmission path to be established through the first one of the three sections of the sharing connector, sections A, B or D, having the appearances of the desired sending circuit, that becomes idle. If, for instance, section A having the first appearance of the desired sending position circuit becomes idle and releases its relay 1102, the continued actuation of the destination push button will complete a circuit for the operation of relay 1103 of section A. Operation of this relay initiates a section of the sharing connector into seeking the marked point and establishing the desired transmission path. In a similar manner either section B or section D, becoming idle while the destination push button is held depressed, permits its relays 1303 or 1503 to become energized in the manner set forth and initiate either one of these sections into operation to establish the desired transmission path. Since the intra-office transmission from an intra-office transmitter circuit to a sending position circuit is at a high rate of speed as, for example, 150 words per minute, the length of time a section of the sharing connector would be busy in the transmission of a normal length message is relatively short. Accordingly, it would normally be a matter of only a fraction of a second, or at most only a few seconds, before one of the needed sharing connector sections would be available.

If the attendant does not desire to wait for one of the desired busy sections to become idle, she may release the destination push button and then operate the release key, such as 214, in the intra-office transmitter circuit from which she attempted to establish the transmission path. She may then proceed to switch messages from the other intra-office transmitter circuits and at some later time switch the message from the first transmitter circuit. When the attendant releases the destination push button without the establishment of a transmission path, all the circuits of the alternate assignor brought into action are fully released.

The operation of the sharing connector is substantially the same as that set forth above when establishing a transmission path to a sending position circuit having but two appearances in the various sections of the sharing connector. For example, the actuation of a destination push button such as 194 representing a sending circuit having two appearances, one in section N and the other in section P, would cause the path to be established through the section having the first appearance, such as section N if it were idle, and section P if idle when section N is busy. With both sections busy, the turret busy lamp is illuminated.

In general, the actuation of destination push button 194 in the above assumed arrangement marks, by means of conductor 515, a point on the marking level of rotary switches 1401 and 1601 as well as the ninth level from the left of alternate assignor rotary switch 1801. In this case when section N is busy, the circuit from ground through the coil of a turret relay, such as 1001, and the upper contacts of push button 194, conductor 516, which would otherwise pass through the tongue and back contact of relay 1402 of section N and the coil of associated relay 1403 to negative potential, is diverted by the operation of relay 1402 to conductor 1411 and through the coil of relay 1711 to potential. Operation of the latter relay through its outer right hand tongue applies ground to the circuit of relay 1702 and also completes through its inner right hand tongue a circuit for effecting operation of step magnet SM of alternate assignor rotary switch 1801. Operation of relay 1702 will complete a circuit for the operation of one of the four relays 1706, 1707, 1708 or 1709, depending upon which group of levels of rotary switch 1801 has a marked point. In accordance with the assumed condition of a point on the ninth level of switch 1801 being marked, relay 1706 will operate when the wiper of this ninth level reaches the marked point. If at this time the section of the second appearance (section P) is idle, a circuit is established from ground through the coil of polar relay 1901, conductor 1902, the second tongue and front contact of relay 1706, the inner tongue and back contact of relay 1802, the wiper of the tenth level of alternate assignor rotary switch 1801, conductor 1812, the second right hand tongue and back contact of relay 1602 and the coil of relay 1603 to negative potential. This circuit, which may be called the second appearance circuit of the sending position, initiates operation of section P to establish the transmission path therethrough in the manner pointed out above. Had section P also been busy, positive potential would have been applied to the second appearance circuit including conductor 1812 and thereby caused the tongue of polar relay 1901 to move to its left hand contact rather than its right hand contact and complete the circuit from ground thereat through the coil of polar relay 1903, the outer tongue and back contact of relay 1904, conductor 1906 to positive potential through the outer tongue and front contact of relay 1706. This circuit causes polar relay 1903 to move its tongue to its left hand contact and complete a circuit through back contacts of relay 1907 for the operation of relay 1908, which in operating functions, as above pointed out, to illuminate the turret busy lamp and remove ground from the circuit which caused operation of relay 607 of the involved turret section.

In order to check on certain features of the operation of the sharing connectors, a set of four electromagnetic counters 1911, 1912, 1913 and 1914 are employed. These counters are of conventional construction and include an electromagnet for advancing a set of dials one digit each time the magnet is energized. Counter 1911 is arranged to count the total number of switching operations or the total number of transmission paths established through the common sharing equipment. Counter 1912 counts the number of times the second appearance or the first alternate is required. Counter 1913 counts the number of times the use of the third appearance or the second alternate is required. Counter 1914 counts the number of times that all the appearances or alternates of a desired sending circuit are busy or the number of times the turret busy lamp such as 511 is lighted. The collecting and recording of this information concerning the message load and its distribution in the sharing equipment is of value in assigning and reassigning the various appearances of the sending circuits.

The magnet of counter 1911 is energized each time any one of the relays such as 1103, 1403 or 1603 operates to apply ground through its second left hand tongue and make contact, the outer left hand tongue and back contact of an associated section relay such as 1102, 1402 or 1602, to conductor 1113. Conductor 1113 is multipled to each section of the sharing connector and a ground applied thereto by operation of any relay such as 1603 will operate counter 1911 to advance the dials thereof. A relay such as 1603 in each section of the sharing connector is operated each time the section is activated to initiate the establishment of a transmission path therethrough.

As set forth above, the tongue of polar relay 1901 moves to the right when the sharing section of a first appearance of a sending circuit is busy and the sharing section of the second appearance is idle. Such operation of relay 1901 completes an obvious circuit for the energization of relay 1904 which in operating completes a circuit through its second tongue for the operation of counter 1912. Hence counter 1912 indicates the number of times the second appearance of a sending circuit is required.

When the sharing section of the second appearance is busy, the tongue of polar relay 1901 moves to the left and if the sending position has an idle third appearance section, the tongue of polar relay 1903 is moved to the right and completes an obvious circuit for the operation of relay 1907. Operation of relay 1907 completes a circuit for the operation of the magnet of counter 1913 to advance the dials thereof and thus indicate the number of times the sharing section of the third appearance of a sending circuit is required.

When the third appearance of a three-appearance sending circuit or the second appearance of a two-appearance circuit is busy, the tongue of polar relay 1903 moves to its left hand contact and completes a circuit for operation of relay 1908. In addition to the above described functions, relay 1908 in operating completes a circuit for operating the magnet of counter 1904 to advance the counters thereof which indicate the number of times all the sections of all the appearances of a sending circuit are busy when an attempt is made to establish a transmission path thereto. The inner tongues of relays 1904 and 1907 are connected by means of conductor 1917 in parallel to the inner right hand tongues of relays such as 1603 in each section of the sharing connector so that if either one of these relays operate when a relay such as 1603 is operated, it is held operated until the relay releases.

Whenever operation of one of the relays such as 1603 applies ground to conductor 1113 to effect operation of counter 1911 and relay 1918 which thus operates each time an attempt is made to establish a transmitting path through the sharing connector or each time the sharing connector is activated, it completes a circuit to the associated turret switching lamp such as 501 to inform the attendant of the progress made. Also through its inner tongue this relay completes a circuit from flasher contacts 1921 to conductor 1922 and through the front contact and inner left hand tongue of the operated one of the turret relays such as 1001, conductor 1013, to the front contact of the second left hand tongue of the turret section relay such as 601. This latter circuit keeps the transmitter switching lamp 216 flashing until the desired transmitting path has been established through the sharing connector.

It will be obvious to those skilled in the art that various modifications of the invention may be made without departing from the spirit or essential attributes thereof, and it is desired that only such limitations be placed thereon as are set forth in the appended claims.

What is claimed is:

1. In a telegraph switching system, a plurality of outgoing transmitting channels, a plurality of groups of storage controlled telegraph transmitters, separate switching means associated with each of said groups for independently establishing transmission paths from the transmitters thereof to predetermined ones of said transmitting channels, a switching means common to all of said transmitters for establishing transmission paths from the transmitters to the others of said transmitting channels, and means for controlling said switching means to permit establishment of paths through individual ones of said separate switching means simultaneously and through said common switching means only one path at a time.

2. In a telegraph switching system, a plurality of outgoing transmitting channels, a plurality of groups of storage controlled telegraph transmitters, a switching means for establishing either a preferred or one of one or more alternate paths of transmission at a time between a transmitter and a transmitting channel, a first set of manually operable elements one for each one of said transmitters, a second set of manually operable elements one for each one of said channels, and means controlled by the actuation of an element in each of said sets for controlling said switching means to establish one of said paths between representative actuated elements.

3. In a telegraph switching system, a switching office having a plurality of incoming and outgoing telegraph channels, selective switching means at said office capable of establishing therethrough a plurality of different paths of transmission one at a time between any one of said incoming channels and any one of said outgoing channels, said means normally establishing a predetermined one of said paths and means operative when the equipment employed in the establishment of the predetermined path is busy to establish another one of said paths.

4. In a telegraph switching system, a switching office having a plurality of incoming and outgoing telegraph channels, selective switching means at said office capable of establishing a transmission path between any one of said incoming and any one of said outgoing channels by a plurality of different routes, one at a time, through said switching means, and means controlled by a busy condition of equipment employed in the establishment of said path over a preferred one of said routes to establish said path over a second one of said routes.

5. In a telegraph switching system, a switching office having a plurality of incoming and outgoing telegraph channels, selective switching means at said office capable of establishing a transmission path between any one of said incoming and any one of said outgoing channels by a plurality of different routes, one at a time, through said switching means, means controlled by a busy condition of equipment employed in the establishment of said path over a preferred one of said routes to establish said path over a second one of said routes, and means controlled by a busy condition of the equipment employed in the establishment of said path over said preferred and said second routes to establish said path over a third one of said routes.

6. In a telegraph switching center, incoming and outgoing signal transmission channels terminating thereat, switching means at said office having equipment for automatically establishing first, second or third signal transmission path routes therethrough one at a time from each one of said incoming channels to each one of said outgoing channels, a route assignor, and means controlled by said assignor for establishing the transmission path through the second route when the equipment of the first is busy and through the third route when the equipment of the first and second are busy.

7. In a telegraph switching center, incoming and outgoing signal transmission channels terminating thereat, switching means having equipment for automatically establishing first, second or third signal transmission path routes therethrough one at a time from each one of said incoming channels to each one of said outgoing channels, a route assignor, means controlled by said assignor for establishing the transmission path through the second route when the equipment of the first is busy and through the third route when the equipment of the first and second are busy, and means operative when the equipment of all routes is busy for establishing the transmission path through the route, the equipment of which first becomes idle.

8. In a telegraph switching system, a plurality of storage controlled transmitters, a plurality of telegraph transmitting channels, switching means having a plurality of individually operative units each capable of establishing therethrough transmitting paths one at a time between some of said transmitters and some of said transmitting channels with a path to each of said transmitting channels capable of being established through any one at a time of a respective group of said individually operative units, a manually operable element for each of said transmitters, a manually operable element for each of said transmitting channels and means including said manually operable elements for controlling said switching means to establish a transmitting path through said units of a group in a preferential predetermined order whereby the path is established through the first idle unit of a group in accordance with the preferential arrangement thereof.

9. In a telegraph switching system, a plurality of storage controlled transmitters, a plurality of telegraph transmitting channels, switching means having a plurality of individually operative units each capable of establishing therethrough transmitting paths, one at a time, between some of said transmitters and some of said transmitting channels with a path to each of said transmitting channels capable of being established through any one at a time of a respective group of said individually operative units, a manually operable element for each of said transmitters, a manually operable element for each of said transmitting channels, means including said manually operable elements for controlling said switching means to establish a transmitting path through said units of a group in a preferential predetermined order whereby the path is established through the first idle unit of a group in accordance with the preferential arrangement thereof, and means operative when all the units of a group are busy to establish the path through the first unit of the group to become idle.

10. In a telegraph switching system, a plurality of incoming channels, a plurality of outgoing channels, switching means capable of establishing one telegraphic transmission path at a time over any one of a plurality of different routes from any one of said incoming channels to any one of said outgoing channels, a first set of manually operable elements, one for each of said incoming channels, a plurality of second sets of manually operable elements, each set having an element for each one of said outgoing channels and means controlled by the operation of an element in said first set and an element in one of said second sets for establishing a telegraphic transmission path between the respective incoming and a respective outgoing channel.

11. In a telegraph switching system, a plurality of incoming channels, a plurality of outgoing channels, switching means capable of establishing one telegraphic transmission path at a time over any one of a plurality of different routes from any one of said incoming channels to any one of said outgoing channels, a first set of manually operable elements, one for each of said incoming channels, a plurality of second sets of manually operable elements, each set having an element for each one of said outgoing channels, means controlled by the operation of an element in said first set and an element in one of said second sets for establishing a telegraphic transmission path between the respective incoming and a respective outgoing channel, and means controlled by the operation of an element in one of said second sets for operatively disabling the elements in the other of said second sets.

12. In a telegraph switching system, a plurality of incoming and outgoing transmission channels, interconnecting means for establishing separate transmission paths between said incoming and outgoing channels, said interconnecting means being capable of establishing said separate paths, one at a time, over any one of a plurality of different routes, and means controlled by an idle condition of equipment in said interconnecting means for determining over which one of said routes said path is established.

13. In a telegraph switching system, a plurality of incoming and outgoing transmission channels, interconnecting means for establishing, one at a time, any one of a plurality of transmission paths between any one of said incoming and any one of said outgoing channels, and means controlled by an idle condition of equipment in said interconnecting means for automatically determining which one of said plurality of paths is established.

14. In a telegraph switching system, an incoming and a plurality of outgoing transmission channels, a first switching unit and a plurality of secondary switching units, said first unit having an individual connection to each of said secondary units, said secondary units each having connections to a plurality of said outgoing channels with the same outgoing channel connected to more than one of said secondary units, and means including manually operable elements to control said first and secondary switching units to automatically establish a transmission path from said incoming channel to any one of said outgoing channels.

15. In a telegraph switching system, an incoming and a plurality of outgoing transmission channels, a first switching unit and a plurality of secondary switching units, said first unit having an individual connection to each of said secondary units, said secondary units each having connections to a plurality of said outgoing channels with the same outgoing channel connected to more than one of said secondary units, means including manually operable elements to control said first and secondary switching units to automatically establish a transmission path from said incoming channel to any of said outgoing channels, and means to select the secondary unit employed in the establishment of the transmission path in accordance with a predetermined arrangement.

16. In a telegraph switching system, a plurality of storage controlled signal transmitters, a plurality of outgoing transmission channels, switching means for establishing transmission paths from any one of said transmitters to any one of said channels, said paths being established over any one of a plurality of different routes, a recording means and means including said recording means for indicating the number of times the various routes through said switching means are established.

17. In a telegraph switching system, a plurality of storage controlled signal transmitters, a plurality of outgoing transmission channels, switching means for establishing transmission paths from any one of said transmitters to any one of said channels over any one of a plurality of different routes, with said routes established in a preferential order and each route including a different unit of said switching means, and means controlled by busy and idle switching units for determining through which route a path is established.

18. In a telegraph switching system, a plurality of storage controlled signal transmitters, a plurality of outgoing transmission channels, a plurality of switching units each having a plurality of outgoing channels associated therewith and with each channel associated with more than one of said units, one of the associated units being employed in the establishment of a transmission path to a channel and made busy thereby, means for employing said units in a preferential order and means for establishing a transmission path to a channel through the first idle one, in accordance with said preferential order, of the associated units.

19. In a telegraph switching system, a plurality of storage controlled signal transmitters, a plurality of outgoing transmission channels, a plurality of switching units each having a plurality of outgoing channels associated therewith and with each channel associated with more than one of said units, one of the associated units being employed in the establishment of a transmission path to a channel and made busy thereby, means for employing said units in a preferential order, means for establishing a transmission path to a channel through the first idle one, in accordance with said preferential order, of the associated units, a signaling device and means for operating said signaling device when an attempt is made to establish a path to a channel having all its associated units busy.

20. In a telegraph switching system, a plurality of storage controlled signal transmitters, a plurality of outgoing transmission channels, a plurality of switching units each having a plurality of outgoing channels associated therewith and with each channel associated with more than one of said units, one of the associated units being employed in the establishment of a transmission path to a channel and made busy thereby, means for employing said units in a preferential order, means for establishing a transmission path to a channel through the first idle, in accordance with said preferential order, of the associated units, a plurality of indicating devices and means including said indicating devices to indicate the number of times the various units are made busy.

WILLIAM B. BLANTON.
FRANK L. CURRIE.
GEORGE W. JANSON.

REFERENCES CITED

The following references are of record in the file of this patent:

UNITED STATES PATENTS

| Number | Name | Date |
|---|---|---|
| 2,344,759 | Wight | Mar. 21, 1944 |
| 2,346,173 | Light | Apr. 11, 1944 |
| 2,390,517 | Currie et al. | Dec. 11, 1945 |
| 2,390,656 | Fitch et al. | Dec. 11, 1945 |
| 2,410,540 | Wight et al. | Nov. 5, 1946 |